United States Patent [19]
Ueda et al.

[11] Patent Number: 5,508,816
[45] Date of Patent: Apr. 16, 1996

[54] SYNCHRONOUS COMPRESSION AND RECONSTRUCTION SYSTEM

[75] Inventors: Hiroaki Ueda; Hidehiro Matsumoto; Yushi Niwa, all of Tokyo, Japan

[73] Assignee: NEC Corporation, Tokyo, Japan

[21] Appl. No.: 133,219

[22] Filed: Oct. 7, 1993

[30] Foreign Application Priority Data

Oct. 7, 1992 [JP] Japan .................................... 4-293716
Feb. 3, 1993 [JP] Japan .................................... 5-016035

[51] Int. Cl.$^6$ .............................. H04N 5/91; H04N 5/76; G11B 5/02
[52] U.S. Cl. .......................... 358/341; 358/343; 360/19.1
[58] Field of Search .................................... 358/343, 341, 358/335, 342; 348/515, 423, 384; 360/19.1

[56] References Cited

U.S. PATENT DOCUMENTS

| | | | |
|---|---|---|---|
| Re. 33,535 | 2/1991 | Cooper | 348/515 |
| 4,499,503 | 2/1985 | Suzuki . | |
| 5,138,440 | 8/1992 | Radice . | |
| 5,253,275 | 10/1993 | Yurt et al. | 375/122 |
| 5,315,401 | 5/1994 | Okada et al. | 358/337 |

FOREIGN PATENT DOCUMENTS

| | | |
|---|---|---|
| 0418396 | 3/1991 | European Pat. Off. . |
| 0471118 | 2/1992 | European Pat. Off. . |
| 63-266579 | 11/1988 | Japan . |
| 63-313384 | 12/1988 | Japan . |

*Primary Examiner*—Tommy P. Chin
*Assistant Examiner*—Robert Chevalier
*Attorney, Agent, or Firm*—Sughrue, Mion, Zinn, Macpeak & Seas

[57] ABSTRACT

A synchronous compression system for compressing input video data and audio data with establishing synchronization therebetween, comprises video data compressing circuit for compressing each of first to nth blocks where n is an integer greater than or equal to two in order of the first block to the nth block, audio data compressing circuit for compressing input audio data for one frame, interruption control circuit for controlling to interrupt video data compression when video data compression process is delayed with respect to audio data compression process with reference to frame numbers of those currently compressed in the video data compressing circuit and the audio data compressing circuit.

5 Claims, 26 Drawing Sheets

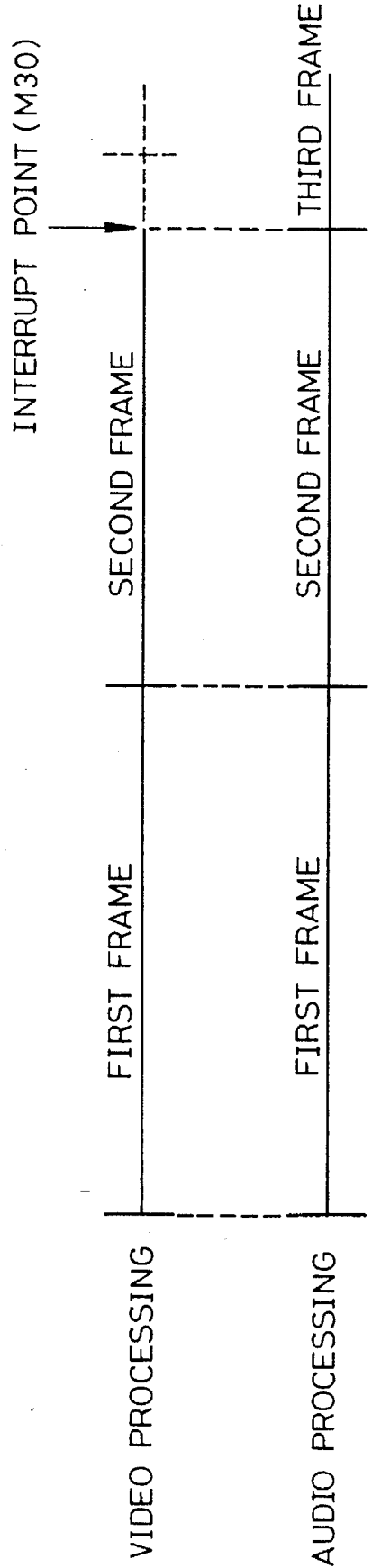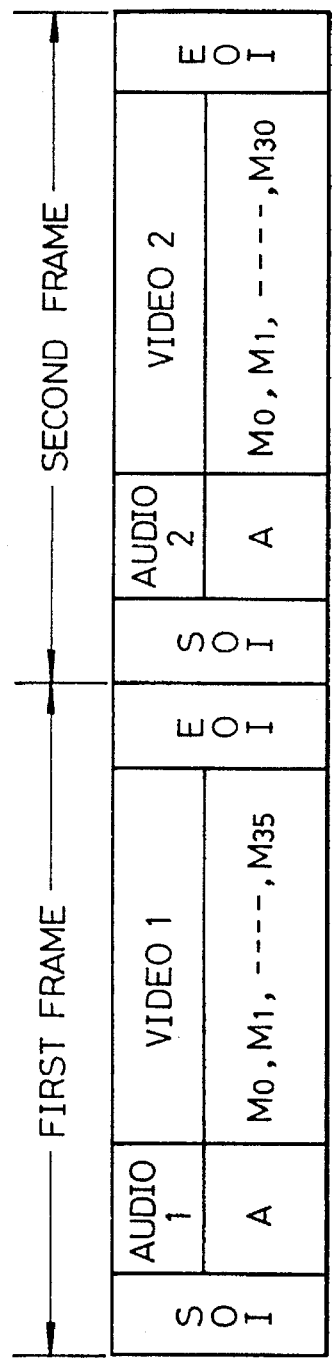

| ON COMPRESSION | $S_{vu} = \frac{1}{4} C_u C_v \sum\limits_{x=0}^{7} \sum\limits_{y=0}^{7} S_{yx} \cos\frac{(2x+1)u\pi}{16} \cos\frac{(2y+1)v\pi}{16}$ |
|---|---|
| ON REPRODUCTION | $S_{yx} = \frac{1}{4} \sum\limits_{u=0}^{7} \sum\limits_{v=0}^{7} C_u C_v S_{uv} \cos\frac{(2x+1)u\pi}{16} \cos\frac{(2y+1)v\pi}{16}$ |

$(C_u, C_v = \frac{1}{\sqrt{2}} : (u,v=0) \quad 1 : (u,v \neq 0))$

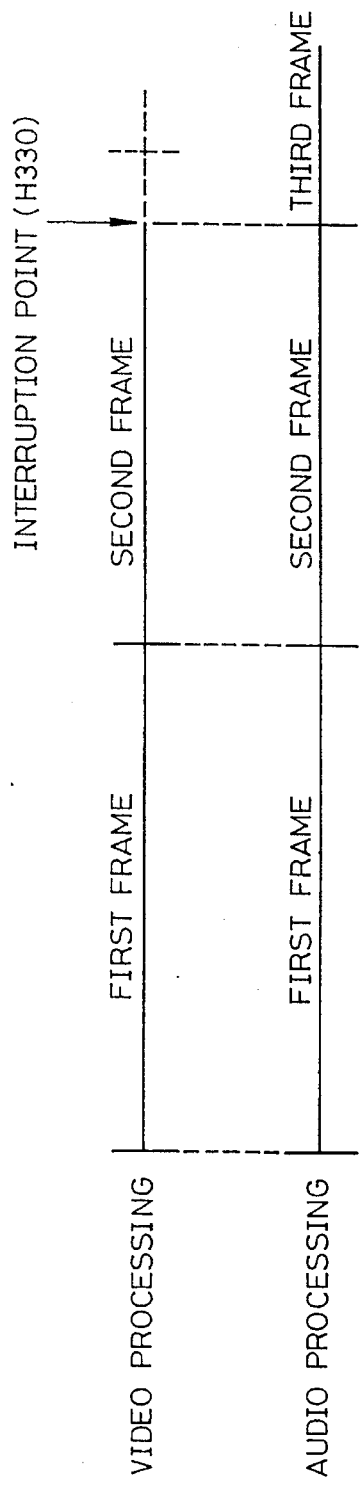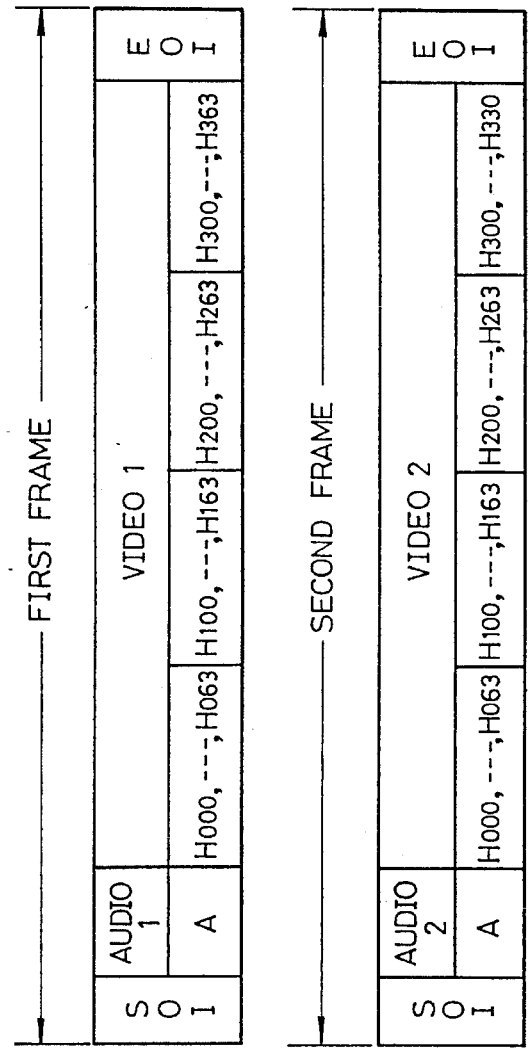

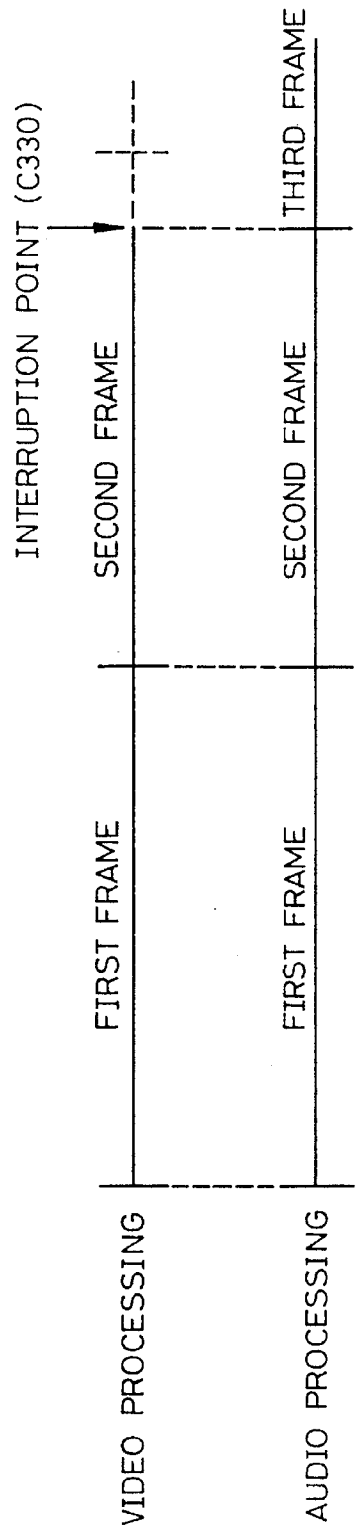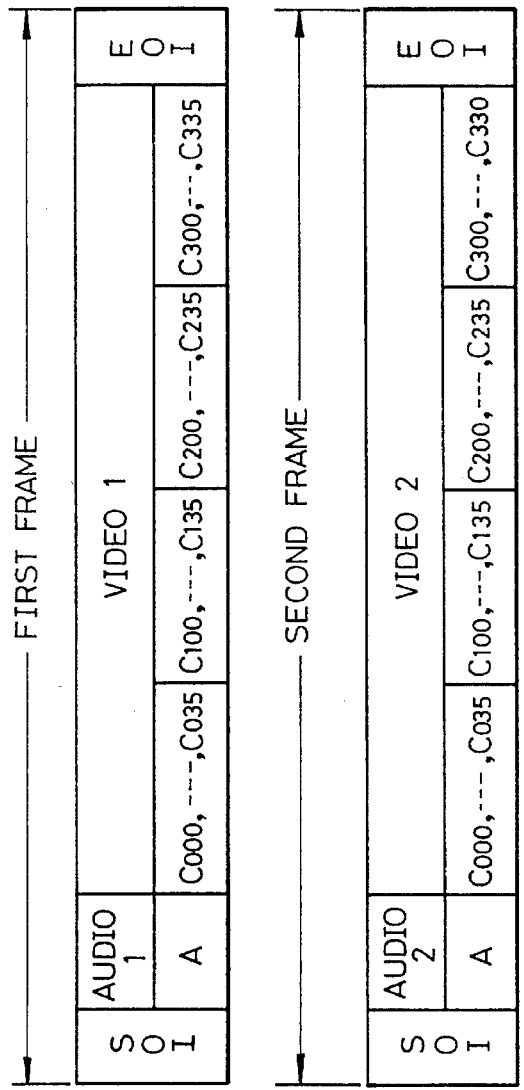

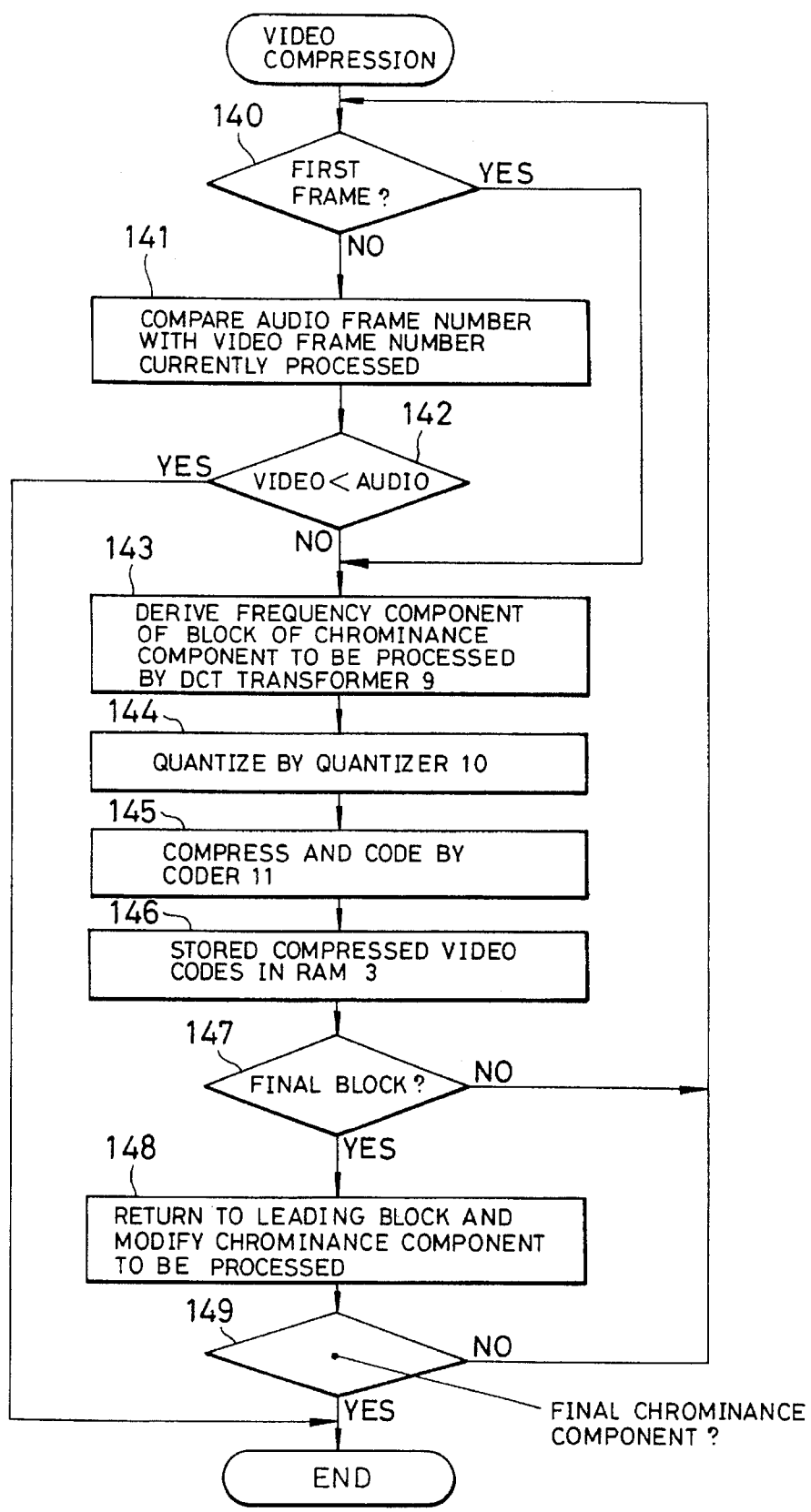

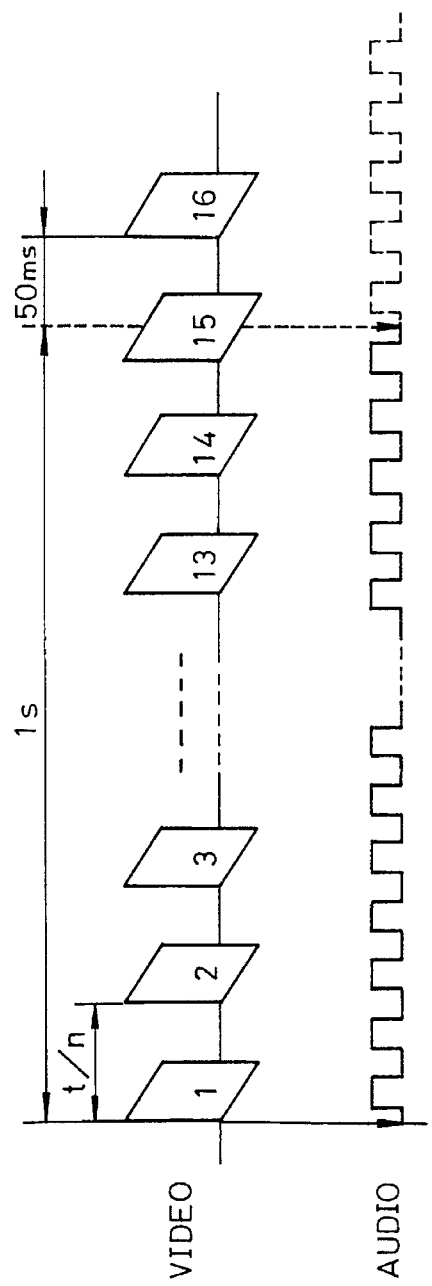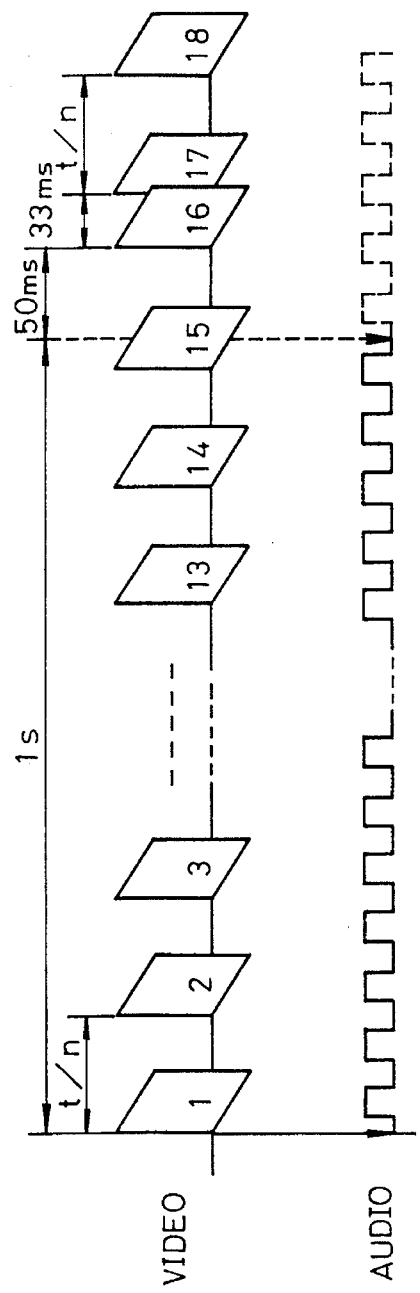

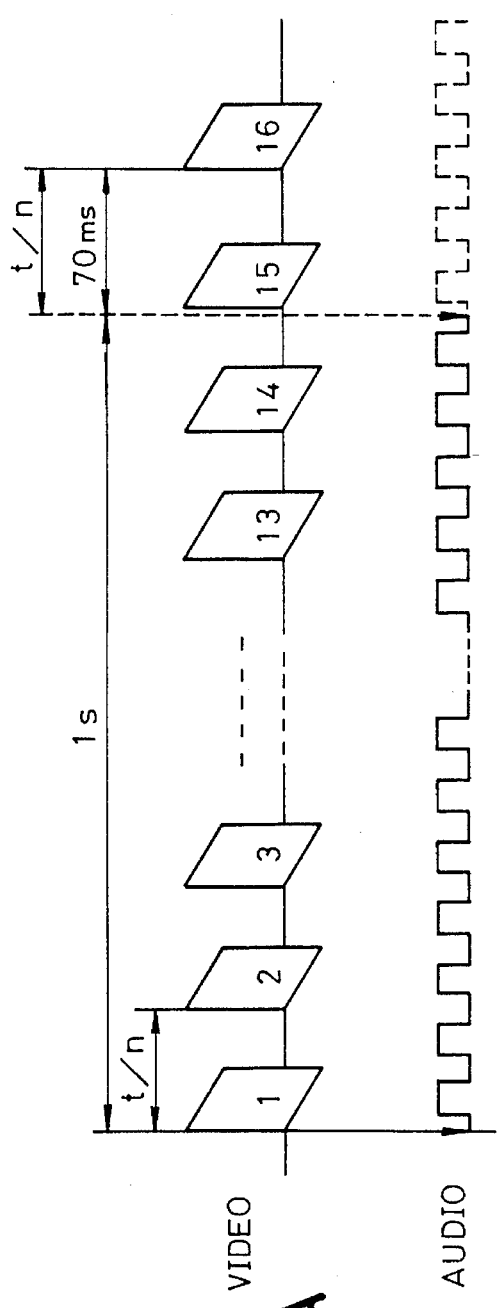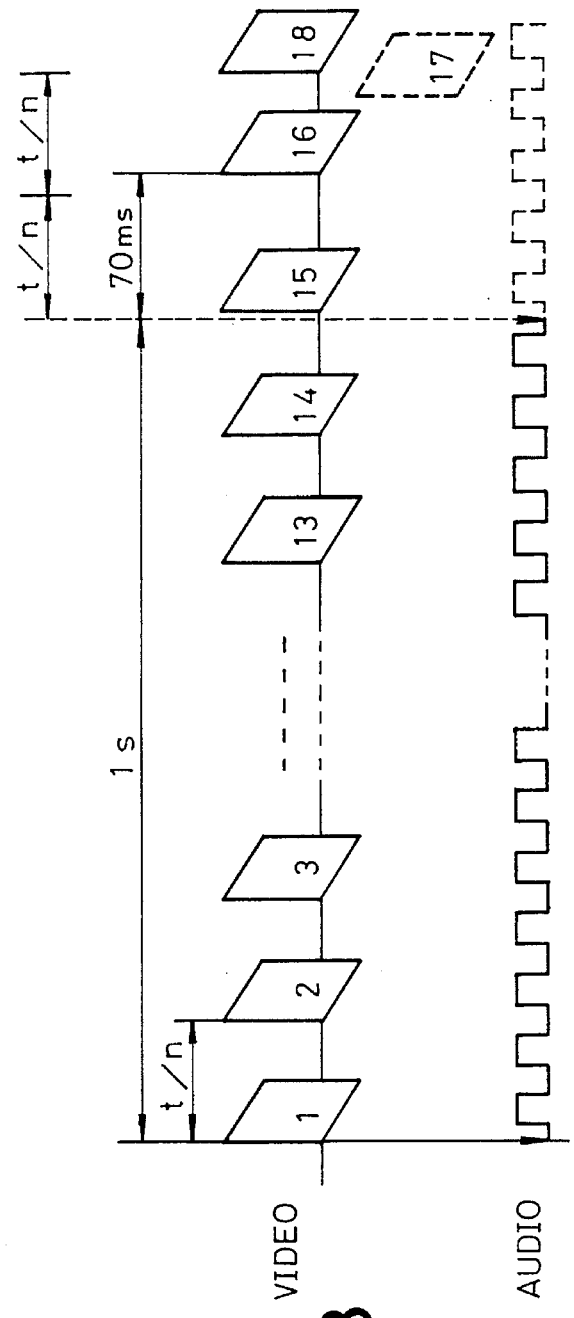
FIG.22A
FIG.22B

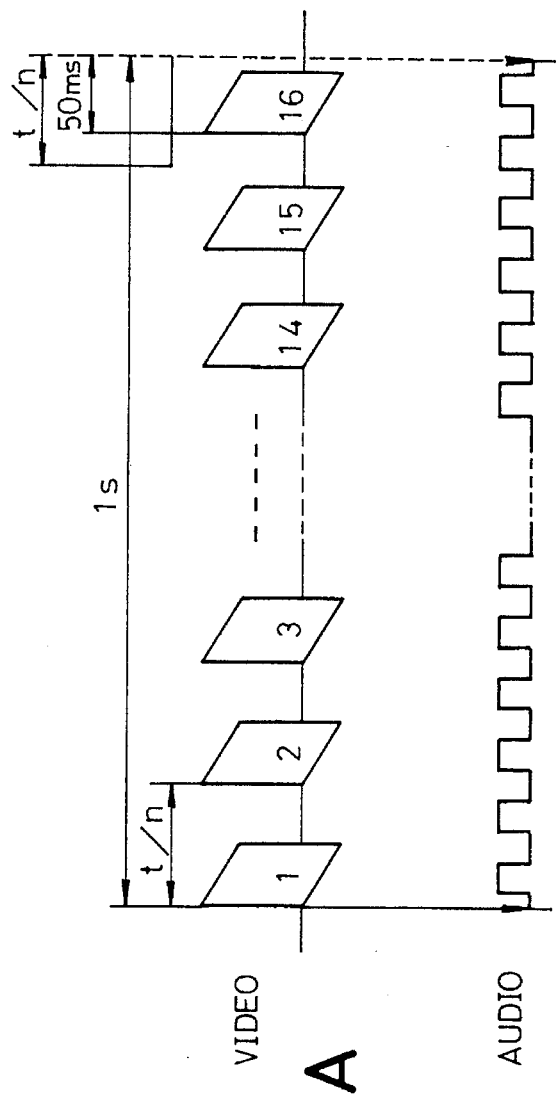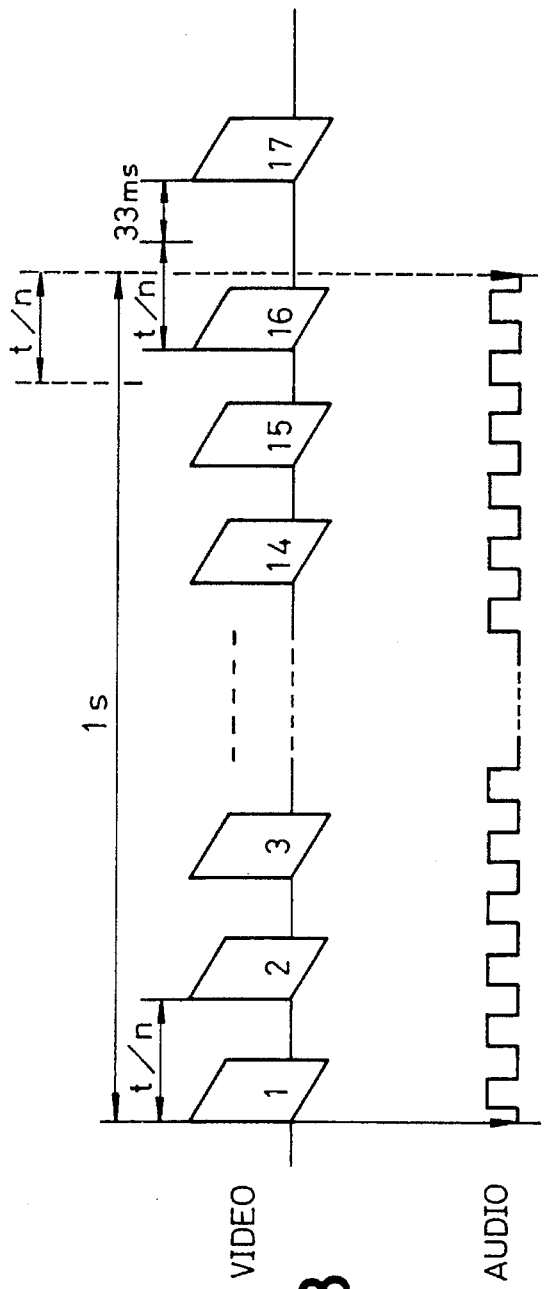
FIG.24A
FIG.24B

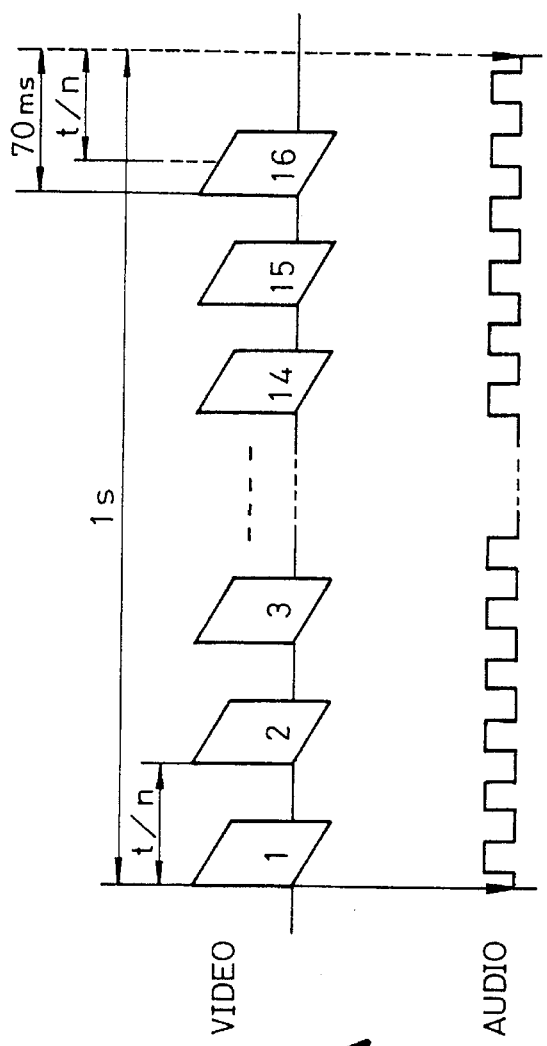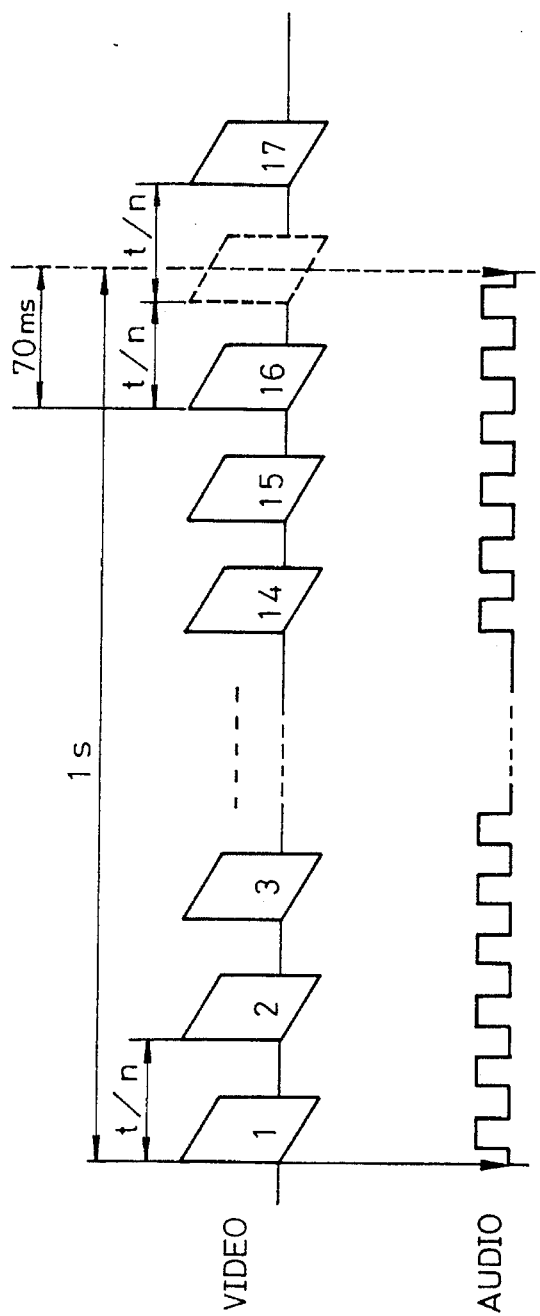
FIG.25A
FIG.25B

SYNCHRONOUS COMPRESSION AND RECONSTRUCTION SYSTEM

BACKGROUND OF THE INVENTION

The present invention relates generally to a synchronous compression and reconstruction system for video and audio data. More specifically, the invention relates to a synchronous compressive recording system for recording video and audio data through compression process with establishing synchronization therebetween, on a recording medium, such as a CD-ROM, hard disk and so forth, and further to a synchronous reconstruction system for synchronously reconstructing video and audio data from the recording medium, on which the data is recorded through a data compression process, or through a telecommunication circuit.

In the recent years, on-line data retrieval systems have been progressively spreading. Through such online data retrieval systems, video and audio data demanded by users can be retrieved by establishing a database for preliminarily recording video data and/or audio data in a large capacity recording medium, such as CD-ROM, hard disk or so forth and by permitting the user to access the database through a telecommunication circuit from a terminal.

In such case, the video and audio data are basically analog data. Therefore, it becomes necessary to perform digital conversion for such data for recording on the recording medium. However, when digital conversion is performed for these analog data, the amount of data becomes much greater than character data. Therefore, various data compression technologies are employed for the video signals and audio signals for recording the large amount of data on the recording medium. Electronic data file systems which can record and retrieve such data have been put into field use.

An example of such system is a multi-media computer system which performs a video and audio signal compressing process according to an image coding method in conformance with ISO10918-1 (JPEG: Joint Photographic Expert Group). In this compression system, compression of an image is generally performed by dividing one frame into 8×8 blocks, and performing discrete cosine transformation (DCT), quantization and entropy coding, respectively per block. Also, reconstruction of the compressed image is performed by performing respective entropy decoding, reverse quantization and reverse DCT for each block of 8×8 blocks.

For such system, an apparatus which can perform high speed edition, compression and recording on the recording medium for a large amount of data of video and/or audio and so forth, is required. Also, when reconstructing audio data in combination with the corresponding video data, matching the reconstruction of the audio and video data (synchronization) becomes necessary. Particularly, due to the performance of the apparatus or size of compressed code of the video image, the recording and reconstructing speed of the video data can be lower than the recording and reconstructing speed of the audio data so that synchronization cannot be established between the video data and audio data upon reconstruction. As a result, the perceived video and audio signals seem unnatural.

Prior art for establishing synchronization have been disclosed in Japanese Unexamined Patent Publication (Kokai) No. 63-168745, Japanese Unexamined Patent Publication No. 63-266579 and Japanese Unexamined Patent Publication No. 63-313384. These conventional synchronization systems will be briefly discussed hereinafter. In the process of data compressive transformation of a large amount of video and audio data, a data file is established for attributes of the data, such as data type, data length, data conversion method, associated data to be synchronized and so forth. These data files are stored as a data control file. Thereafter, using the data file stored in the data control file, so-called simulated reconstruction in a form assuming reconstruction of data recording in a final form of a recording medium is performed. At this time, real time reconstruction of the audio signal, combination of the image and voice, matching quality of reconstruction timings and so forth are checked by eye and ear:

At this time, reconstruction is performed on the basis of the content of data file in a control file, and the process of simulated reconstruction is modified to freely set the timing or so forth when the synchronization between the image and voice is not established. By such simulated reconstruction, operation is checked and adjusted to generate an edited program file.

In such a video/audio synchronization system in the conventional video and audio compressive reconstruction system, drawbacks are encountered in that the data file must be generated for matching the timing, and the simulated reconstruction on the basis of the content of the data file and checking the operation have to be repeated. According, such work is time consuming.

Also, in another conventional video and audio synchronization system, digital codings of the video data and the audio data are performed by mutually independent equipment. Then, the video data and the audio data are correlated according to a given format, transmitted or accumulated, and reproduced by independent decoders for the video data and the audio data after separating the video and audio data again. As a method for realizing coincidence between the video data and the audio data, a method for providing a reconstruction format generated by predicting the delay magnitude between the video data and the audio data in each individual reconstruction system for coupling the video and audio data for simultaneous reconstruction is employed. Alternatively, a method for providing an "output delay circuit" for the reconstruction system and adjusting the delay magnitude of a subject dynamic image, is employed.

For example, Japanese Unexamined Patent Publication No. 3-150552, for "Video and Audio Editing System" discloses a synchronization method for editing the audio data recording on a magnetic tape through digital conversion therefor, with respect to a video film (primarily a movie or so forth). In the disclosed method, after performing patching work for the audio data according to address data included in the magnetic film, reconstruction is performed employing an editing magnetic tape capable of perforation synchronous driving with the video film. Namely, synchronization of the system is realized by hardware, which functions satisfactory with a sufficient preliminary adjustment.

Furthermore, an editing means disclosed in the last-identified publication is provided with means which is described as "having a function to modify only length without causing variation of tone of the voice" as a measure for the case where "words finish earlier than pictures" possibly caused after the recording of "words", so that output image and voice are checked by human eye and ear to make correction with one or more operations.

In the above-mentioned conventional video and audio synchronization system, since the amount of data to be generated varies depending upon the nature of the subject image, (i.e. due to the complexity of the picture or magnitude of action, the picture fluctuates per unit for coding so that the period required for decoding reconstruction of the image cannot be determined unitarily, synchronization is not performed initially. Then, measure is taken to predict a delay magnitude as a typical value to process all data with a uniform reference, or, as in the editing operation of movie, after checking the deviation of the magnitude of delay between the image and the voice upon reconstruction through actual reconstruction, prediction of the delay magnitude between the image and voice is performed again for coupling in order to obtain coincidence. Therefore, it is not possible to correct the delay magnitude between the image and the voice in a method adapted to a condition in real time for precisely maintaining synchronization between the image and voice upon reconstruction. This may cause problems of interruption of a sequentially reproduced voice, variation of tone and so forth.

SUMMARY OF THE INVENTION

Therefore, it is an object of the present invention to provide a compression system which can perform recording of video and audio data with automatically establishing synchronization of an image and a voice without requiring generation of a data file or so forth.

Another object of the invention is to provide a reconstruction system which can reproduce the video and the audio data recorded on a recording medium with data compression or transmitted through a telecommunication circuit, with automatically synchronizing the image and the voice without requiring generation of the data file or so forth or cumbersome operations, such as simulated reconstruction or so forth.

A further object of the present invention is to provide a synchronous reconstruction system which permits correction of a deviation magnitude to be caused during decoding reconstruction of digital coded video and audio data in a method adapted to the condition in real time.

According to a first aspect of the present invention, a synchronous compression system for compressing input video data and audio data with establishing synchronization therebetween, comprises:
  video data compressing means for compressing each of first to nth blocks where n is an integer greater than or equal to two in order of the first block to the nth block;
  audio data compressing means for compressing input audio data for one frame;
  interruption control means for controlling to interrupt video data compression when video data compression process is delayed with respect to audio data compression process with reference to frame numbers of those currently compressed in the video data compressing means and the audio data compressing means.

According to a second aspect of the invention, a synchronous reconstruction system for synchronously reconstructing input video data and audio data respectively compressed per frame, comprises:
  video data reconstructing means for scanning first to nth blocks of one frame input video data in order, which each one frame of video data is divided into first to nth blocks;
  audio data reconstructing means for reconstructing input audio data for one frame;
  interruption control means for controlling to interrupt video data reconstruction when video data reconstruction process is delayed with respect to audio data reconstruction process with reference to frame numbers of those currently compressed in the video data reconstructing means and the audio data reconstructing means.

According to a third aspect of the invention, a synchronous reconstruction system for synchronously decoding and reconstructing digitally coded video data and audio data, comprises:
  storage means for preliminarily storing digitally coded video and audio data;
  video data reconstructing means for decoding and reconstructing digitally coded video data per predetermined data amount;
  audio data reconstructing means for decoding and reconstructing audio data;
  transfer control means for reading out digitally coded audio data from the storage means and transferring the read out digitally coded audio data to respective of the video data reconstructing means and the audio data reconstructing means; and
  control means responsive to completion of decoding and reconstructing process of both of the video data reconstructing means and the audio data reconstructing means for controlling modification of initiation timing of the video data reconstructing means and image display period after video reconstruction process.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention but are for explanation and understanding only.

In the drawings:

FIG. 6(A) is a timing chart in compression of one frame image per block;

FIG. 6(B) is an illustration of a data format after compression;

FIG. 10(A) is a timing chart in the case where compression process is performed per the frequency component of the one frame of image;

FIG. 10(B) is an illustration of a data format after compression;

FIG. 14(A) is a timing chart for compressing the one frame of image per chrominance component;

FIG. 14(B) is an illustration of a data format after compression;

FIG. 15 is a flowchart showing compression process of FIG. 14;

FIGS. 19–25B are illustrations showing a relationship between an image frame and a voice.

DESCRIPTION OF THE PREFERRED EMBODIMENT

The preferred embodiments of the present invention will be discussed hereinafter in detail with reference to the drawings.

Figure 1:
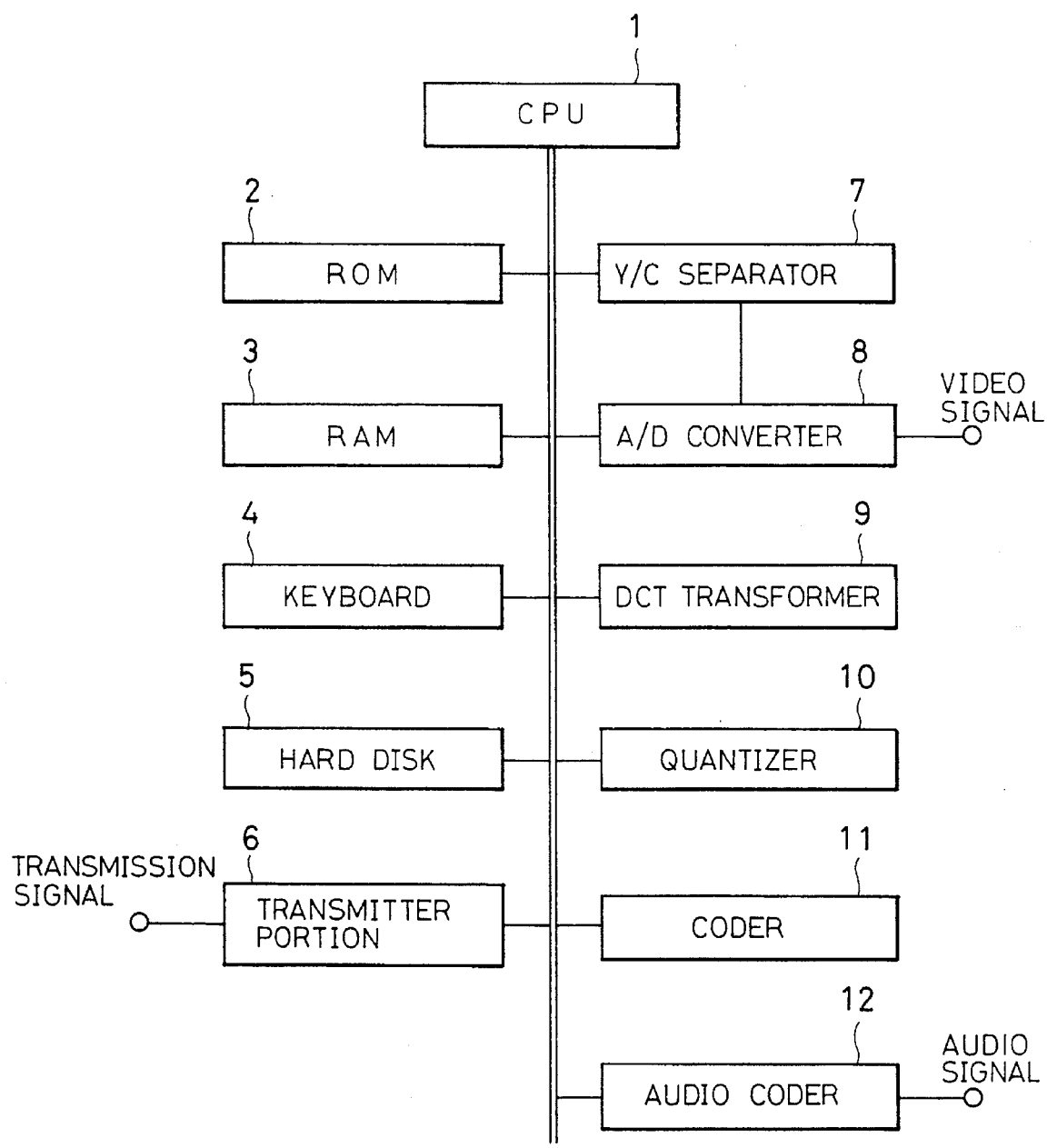
FIG. 1 is a block diagram of a video and an audio synchronous compression system applicable for an embodiment of the present invention.

FIG. 1 is a block diagram of a preferred embodiment of a synchronous compression system according to the present invention, which illustrates a video and an audio compression system in an image coding method of a multi-media computer in conformance with ISO10918-1 (JPEG).

In the drawings, CPU 1 executes programs stored in ROM 2 for controlling the overall system. RAM 3 is a memory for temporarily storing data during a compression process. A key board 4 is adapted to designate the video and audio data compression process. A hard disk 5 records video code and audio code coded with compression and stored in the RAM 3. A transmitter portion 6 transmits the coded and compressed video code and audio code to a telecommunication circuit.

An input video signal is subject to A/D conversion by an A/D converter 8 and separated into a luminance signal and a chrominance signal by a Y/C separator 7. Thereafter, the input video signal is subject to a discrete cosine transformation by a DCT transformer 9, quatization by a quantizer 10, and high efficiency compression and coding by a coder 11, and then stored in the RAM 3. An input audio signal is subject to compression and coding by an audio coder 12 and is stored in the RAM 3.

Figure 2:
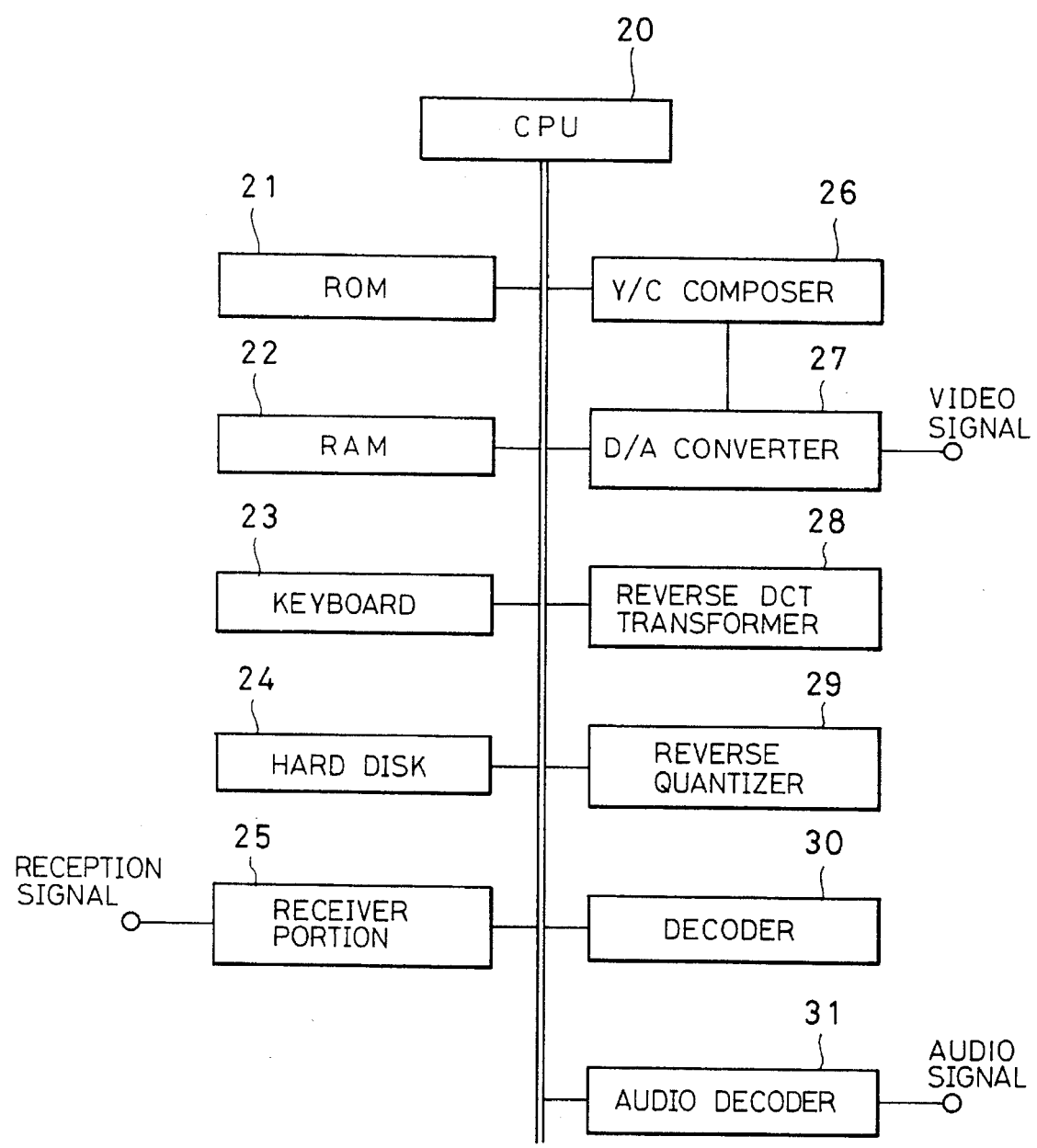
FIG. 2 is a block diagram of a video and an audio synchronous reconstruction system applicable for an embodiment of the invention.

FIG. 2 is a system block diagram of the preferred embodiment of a synchronous reconstruction system of the present invention and shows a video and audio reconstructing apparatus employing the image coding method of a multi-media computer in conformance with ISO10918-1 (JPEG).

In FIG. 2, CPU 20 executes programs stored in ROM 21 for controlling the overall system. RAM 22 temporarily stores data during the reconstruction process. A key board 23 is adapted to designate the process video and audio reconstructing process. A hard disk 24 records the compressed and coded video code and audio code, and the codes can be read in the RAM 22. A receiver portion 23 receives the compressed and coded video code and audio code.

The compressed video code read in the RAM 22 is coded by a decoder 30 and subject to a reverse quantization by a reverse quantizer 29. Thereafter, reverse discrete cosine transformation by a reverse DCT transformer 28, composition of the luminance signal and the chrominance signal by a Y/C composer, and D/A conversion by a D/A converter 27 are performed for outputting a video signal. The compressed audio signal read in the RAM 22 is decoded by an audio decoder 31 and output as an audio signal.

Figure 3:
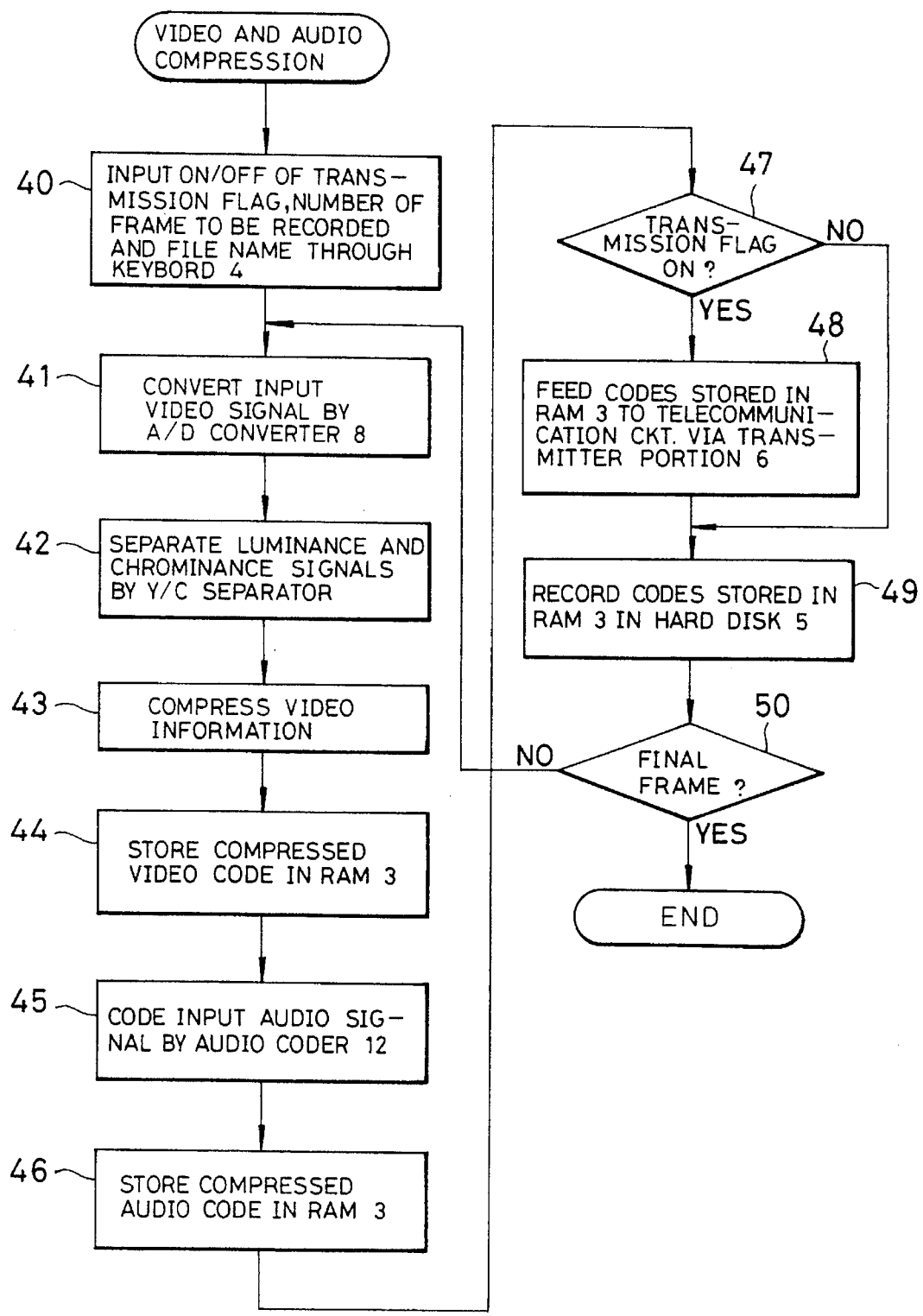
FIG. 3 is a flowchart of an operation of the system of FIG. 1.

FIG. 3 is a flowchart for controlling compression process for the video and audio data. As shown in the flowchart of FIG. 3, once the compression process is initiated, the ON/OFF status of a transmission flag, number of frames (or fields) to be recorded, file and so forth are input through the key board 4 (step 40). Then, the input video signal is converted into a digital data by the A/D converter 8 (step 41), separated into the luminance signal and the chrominance signal by the Y/C separation circuit 7 (step 42), subject to video compression (step 43), and stored in the RAM 3 as a compressed code of the video data.

Next, the input audio signal is coded by the audio coder 12 (step 45), and stored in the RAM 3 as the audio compressed code (step 46). A check is performed to determine whether the transmission flag is ON (step 47). Otherwise, the process is advanced to a step 49. When the transmission flag is ON, the video and audio codes in the RAM 3 are transmitted to the telecommunication circuit through the transmitter portion 6 (step 48). Subsequently, the video and audio codes in the RAM 3 are recorded on the hard disk 5 (step 49). Then, a judgement is made whether the current frame (or field) is the final frame (or field) (step 50). If not, the process returns to the step 41 and otherwise, (i.e. when the current frame is the final frame) the process ends.

Figure 4:
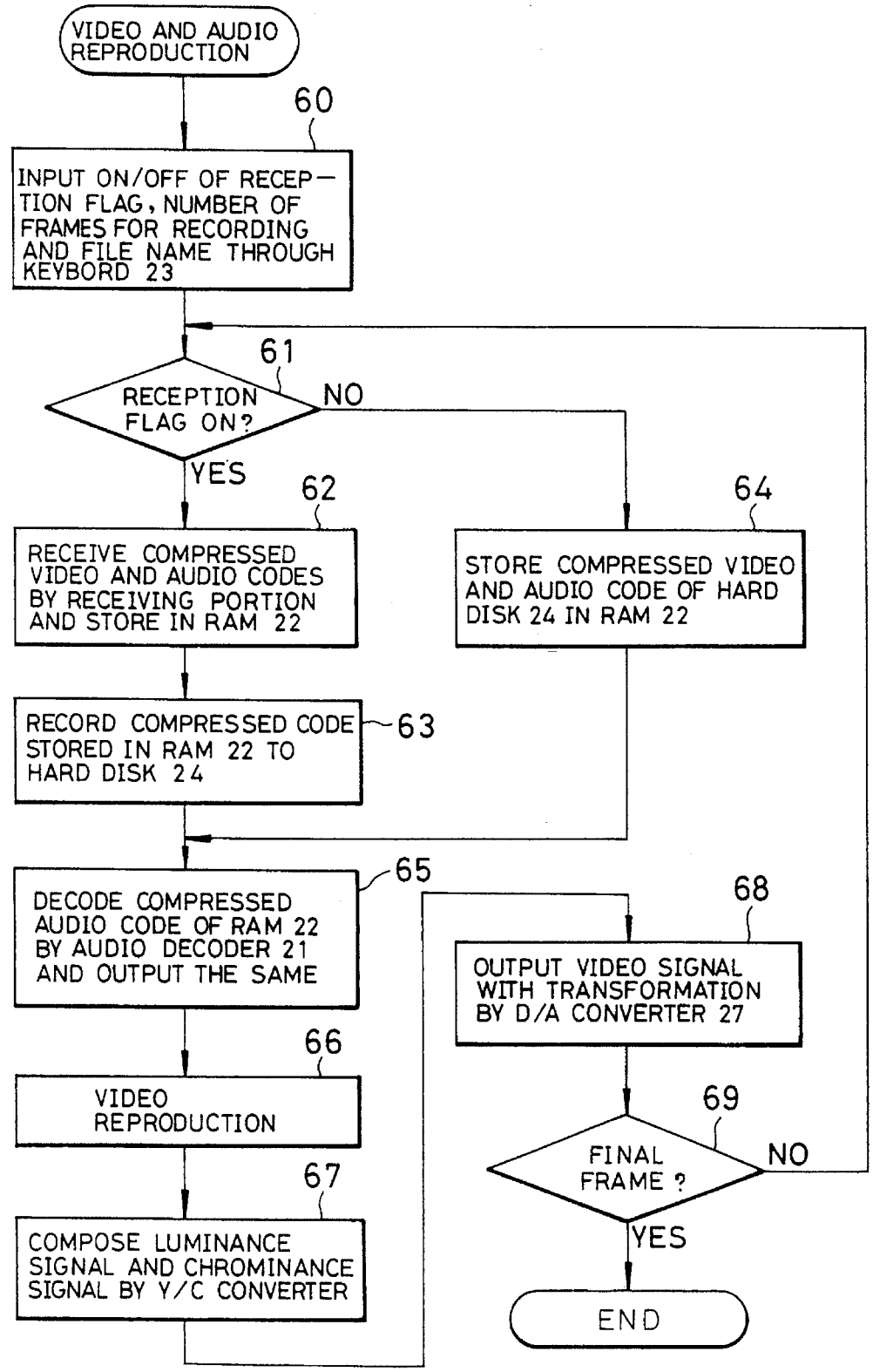
FIG. 4 is a flowchart of an operation of the system of FIG. 2.

FIG. 4 is a flowchart of a routine for controlling the video and audio reconstruction process. As shown in the flowchart of FIG. 4, once a reconstructing apparatus initiates operation, the ON/OFF status of a reception flag, number of frames (or fields) to be reproduced, and file name are input through the key board 23 (step 60). Next, a check is performed to determine whether the reception flag is ON (step 61). If so, the compressed video and audio codes are received from the telecommunication circuit by the receiver portion 25 and stored in the RAM 22 (step 62). The compressed video and audio codes stored in the RAM 22 are recorded on the hard disk 24 (step 63 ).

If the reception flag is not ON, the compressed video and audio codes are read out from the hard disk 24 and stored in the RAM 22 (step 64). Then, the process is advanced to a step 65, where the compressed audio code stored in the RAM 22 is decoded by the audio decoder 31 to be output as the audio signal (step 5). Subsequently, the compressed video code is reproduced (step 66). The luminance signal and the chrominance signal are then composed by the Y/C composer 27 (step 67), and converted by the D/A converter 27 for outputting as the video signal (step 68). Next, a judgement is performed to determine whether the current frame (or field) is the final frame (or field), (step 69. If not, the process returns to the step 61, and otherwise (i.e. when the current frame is the final frame) the process ends.

The foregoing is the brief of the construction and operation of the compression and reconstruction system of the preferred embodiment of the invention. The further details of the preferred embodiments will be given hereinafter, which discussion will be given separately.

(1) Interrupting Operation per Unit of Video Compression and Reconstruction Process FIGS. 5–8 are illustrations of an example of a process for video and audio synchronization by interrupting a video compression and reconstruction process after a unit of compression and reconstruction when the video compression and reconstruction are delayed relative to an audio compression and reconstruction process.

Figure 5:
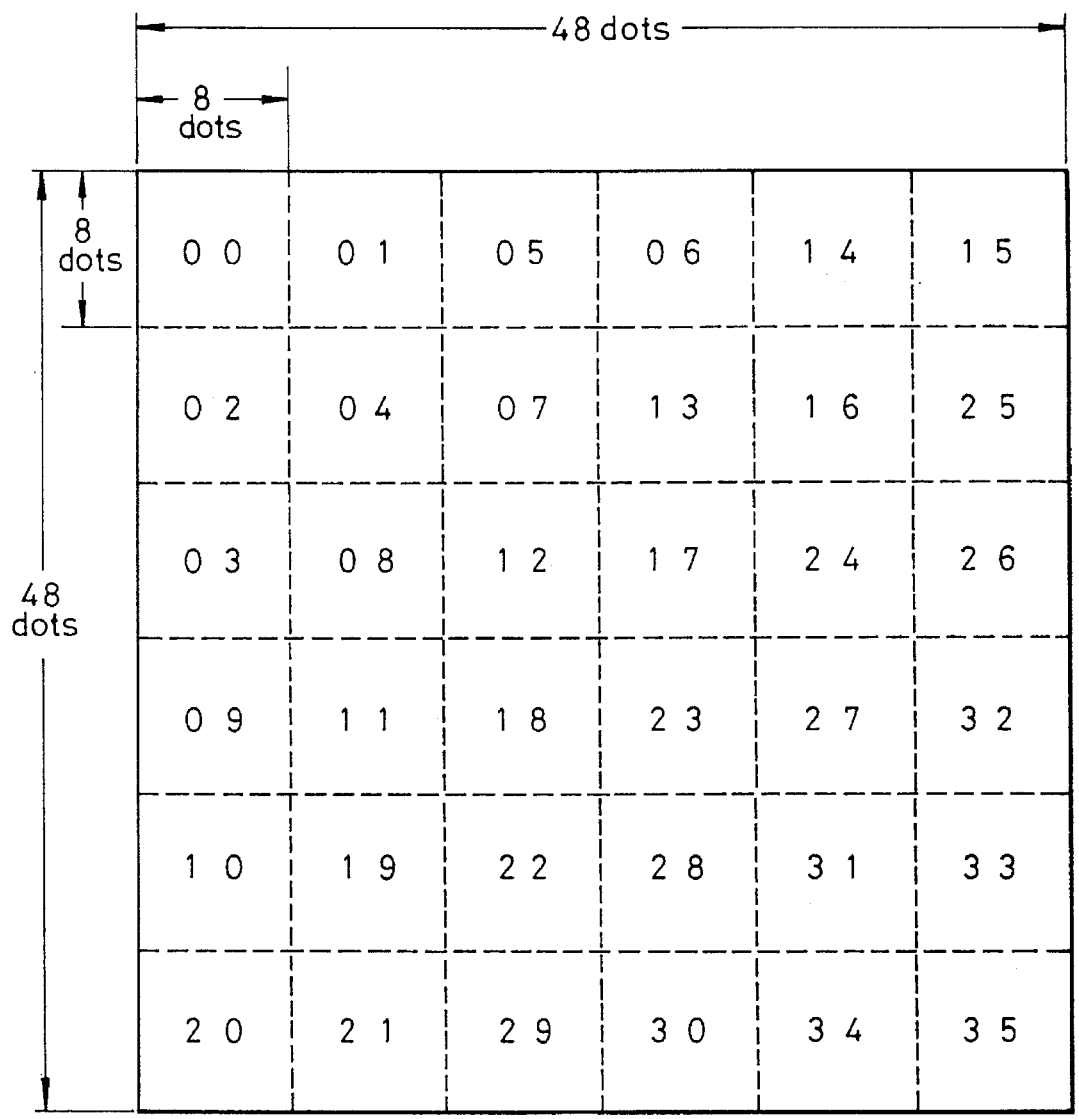
FIG. 5 is an illustration showing an example of the manner for dividing one frame of image into a plurality of blocks.

FIG. 5 is an illustration to be used for the discussion with respect to the block as a processing unit while one frame of image is compressed. Although one frame is discussed as 48×48 dots in FIG. 5, it is practically 600×400 dots. Here, 48×48 will be used for simplification. The image of 48×48 dots are separated into thirty-six blocks of 0th to 35th (each block will consist of 8×8 dots). The compression process is performed per the unit of blocks.

In this case, the order of the compression process is zigzag scanning to scan the blocks in the order of increasing block number in FIG. 5. At this time, as shown in FIG. 6(A), the audio data and the video data in the same frame are processed in parallel. Here, assuming that while the 30th block of the 2nd frame is being processed, and the audio compression process is initiated for the 3rd frame, the 31st block of the 2nd frame of the video data is not processed so that the 0th block in the 3rd frame can be processed.

As shown in FIG. 6(B), in the audio and the video codes thus prepared, the video codes of the 0th to 35th blocks (M0–M35) are stored for the first frame, in which interruption has not been caused, and the video codes of the 0th–30th blocks are stored for the second frame, in which the interruption has been caused.

It the drawing, A denotes the compressed audio signal, SOI is a code representative of the leading end of the frame, and EOI is a code representative of the trailing the end of the frame.

Figure 7:
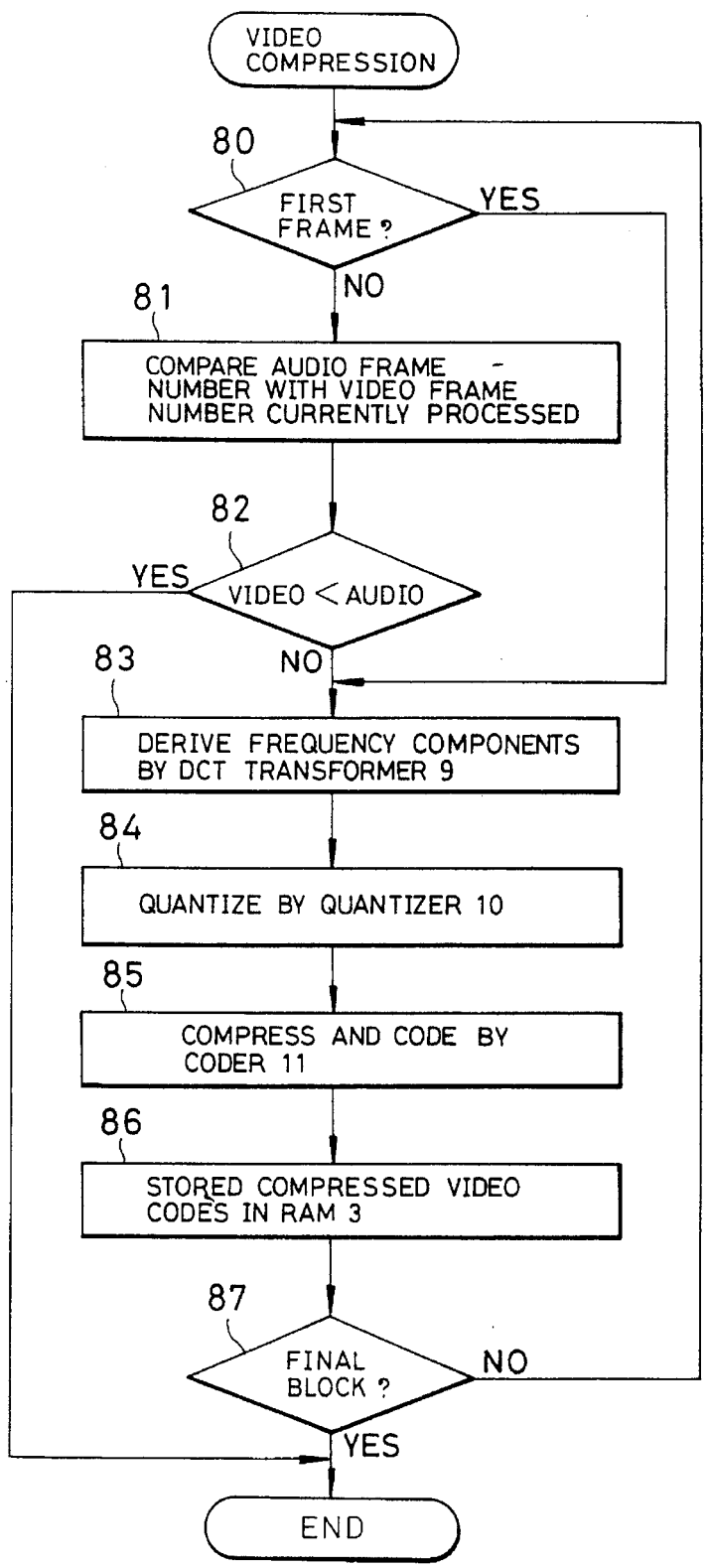
FIG. 7 is a flowchart showing the compression process of FIG. 6.

FIG. 7 is a flowchart showing the process for interrupting the video compression per block. As shown in the flowchart of FIG. 7, once video compression is initiated, a judgement is made to determine whether the current frame is the first frame (step 80). If so, the process is jumped to a step 83, and otherwise, the audio frame number and the video frame number currently processed are compared each other (step 81) to determine whether the video processing is delayed with respect to the audio recording (step 82). If delayed, after completion of compression for the currently processed block, the video signal processing for the current frame is terminated. Otherwise, the frequency component is derived from the block by the DCT transformer (step 83). Then quantization is performed by the quantizer 10 (step 84), high efficiency compressive coding is performed by the coder 11 (step 85), and the compressed video code is stored in the RAM (step 86). Finally, a check is performed to determine whether the current block is the final block or not.

Figure 8:
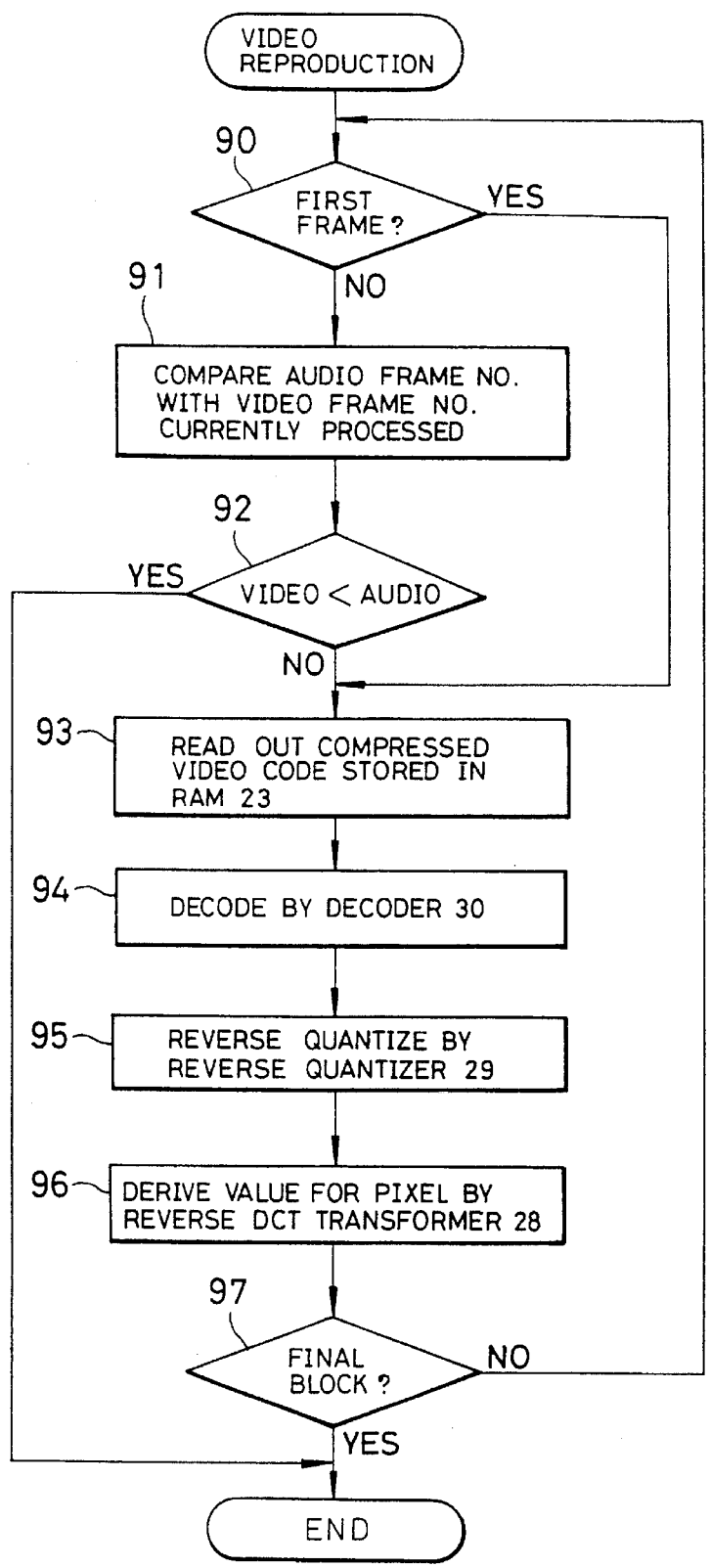
FIG. 8 is a flowchart showing the reconstruction process of FIG. 6.

Upon reconstruction, as shown in FIG. 8, once video reconstruction is initiated, a check is initially performed to determine whether the current frame is the first frame (step 90). If so, the process is advanced to a step 93. Otherwise, a comparison is made between the audio frame number and the video frame number (step 91) to determine whether the video processing is delayed from the audio processing or not (step 92). If delayed, after completion of compression for the currently processed block, the video signal processing for the current frame is terminated. Otherwise the compressed video code stored in the RAM 22 is read out (step 93) and decoded by the decoder 30 (step 94). Then reverse quantization is performed by the reverse quantizer 29 (step 95), and the value of the image is derived by the reverse DCT transformer 28 (step 96). Finally, the check is performed to determine whether the current block is the final block or not (step 97). Otherwise the process returned to the step 90. If the current block is the final block, reconstruction of the video data is terminated.

Figures 9A, 9B:
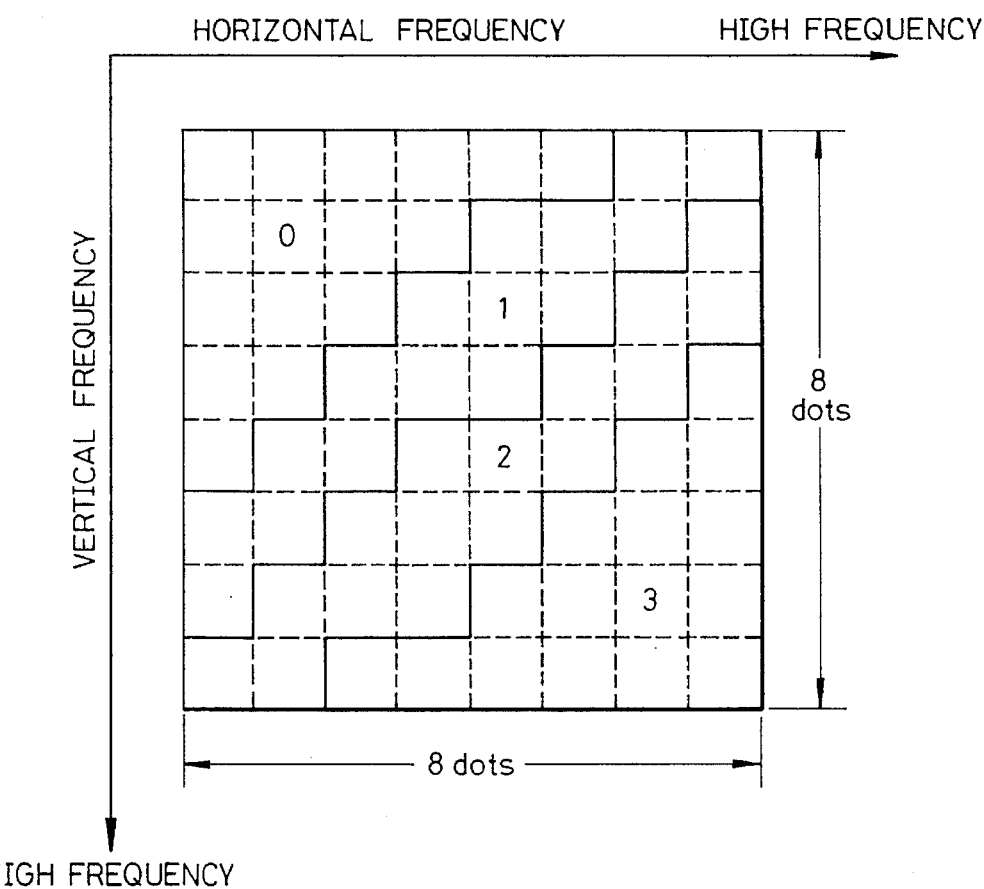
FIG. 9(A) is an illustration showing an example of the case where one block of the image is further divided into a plurality of frequency components.
FIG. 9(B) is an illustration showing an example of a transforming equation for compressing and reconstructing process of the image per the frequency component.

(2) Interruption Operation per Frequency Component of Video Compression and Reconstruction Process FIGS. 9–12 is an illustration showing an example of a process for establishing synchronization between the audio and video data by interrupting the video compression and reconstruction process frequency component in a block unit when the video compression and reconstruction process is delayed from the audio compression and reconstruction process, FIG. 9(A) shows that each block (i.e. each) of the 0th to 35th blocks shown in FIG. 5) consists of a matrix of 8 horizontal frequency x vertical frequencies. This matrix of 64 component frequencies are further divided into four components (0–3) as shown in FIG. 5.

The order for the compression and reconstruction process is as follow. First, the process is performed for the 0th–63th frequency components of 0th block, then for 0th–63th frequency components of the 1st block, then for 0th–63th frequency components of the 2nd block, and then for 0th to 63th frequency components of the 3rd block and so on.

FIG. 9(B) shows transforming equations upon video compression and reconstruction. In the figure, $S_{vu}$ is a sample value after compression, $S_{yx}$ is a sample value before compression or after reconstruction, $\mu$ is a horizontal spatial frequency, and $v$ is a vertical spatial frequency.

As shown in FIG. 10(A), the audio data and video data in the same frame are processed in parallel. Here, assuming that while the 30th frequency component of the 3rd block component of the 2nd frame is being processed, and the audio compression process is initiated for the 3rd frame, the 31st frequency component of the 3rd block of the 2nd frame is not processed so that the process from the 0th frequency component in the 0th block of the 3rd frame can be started.

The audio and video codes thus generated are stored. In the shown case, as shown in FIG. 10(B), the codes (H000–H063) of the 0th–63th frequency components of the 0th block, the codes (H100–H163) of the 0th–63th frequency components of the 1st block, the codes (H200–H263) of the 0th–63th frequency components of the 2nd block, the codes (H300–H363) of the 0th–63th frequency components of the 3rd block of the 1st frame, are stored. For the 2nd frame, in which the interruption is caused, the codes (H000–H263) of the 0th–63th frequency components of the 0th–2nd blocks, and the codes (H300–H330) of the 0th–30th frequency components of the 3rd block are only stored.

Figure 11:
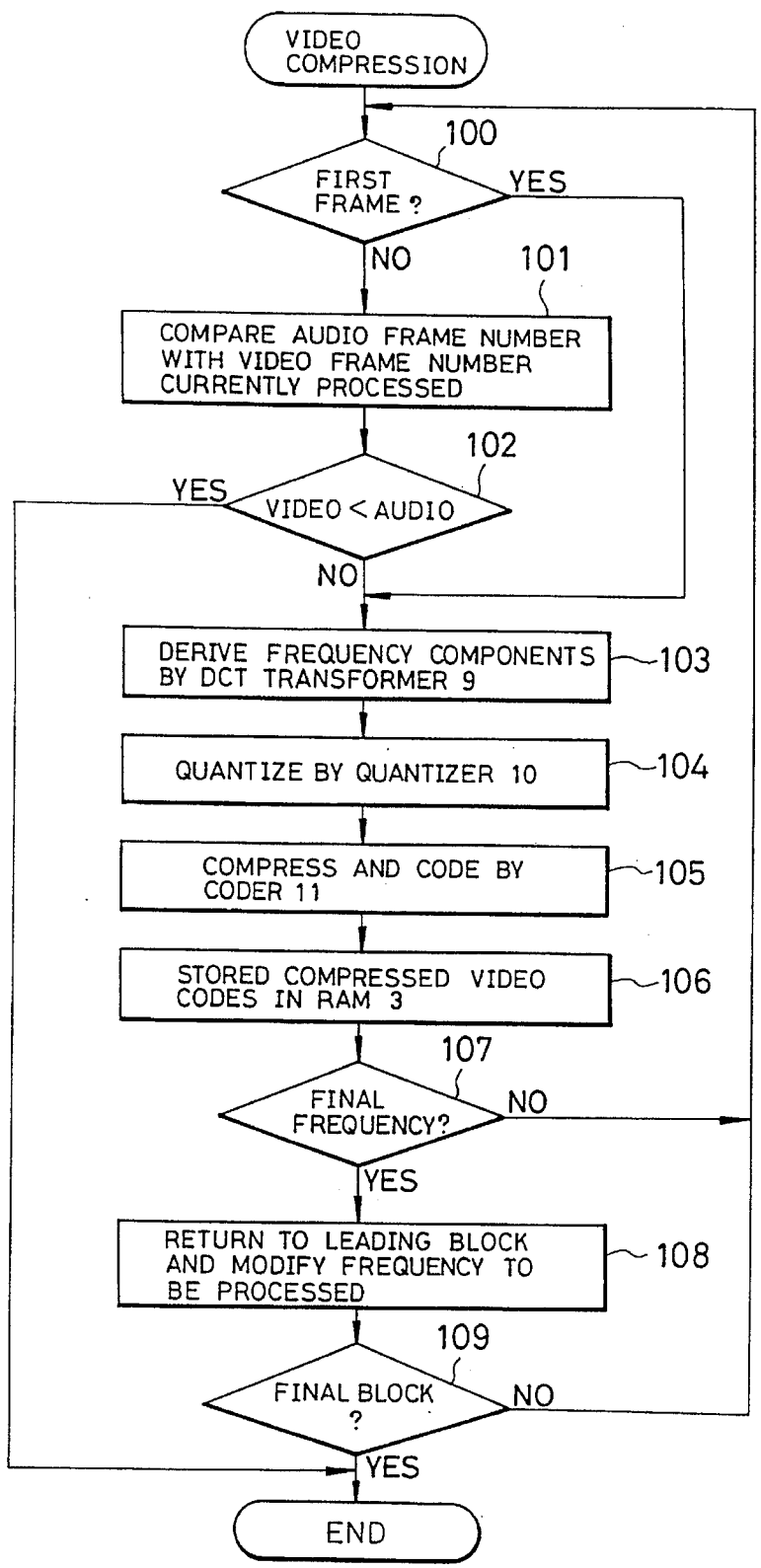
FIG. 11 is a flowchart showing the compression process of FIG. 10.

FIG. 11 shows a flowchart for interrupting the process for the video compression process per a unit of the frequency component. As shown in the flowchart of FIG. 11, once video compression is initiated, a judgement is made to determine whether the current frame is the first frame (step 100). If so, the process is jumped to a step 103, and otherwise, the audio frame number and the video frame number currently being processed are compared with each other (step 101) to determine whether the video processing is delayed with respect to the audio recording (step 102). If delayed, after completion of compression for the currently processed block of the frequency component, the video signal processing for the current frame is terminated. Otherwise the frequency component is derived from the block by the DCT transformer (step 103). Then quantization is performed by the quantizer 10 (step 104), high efficiency compressive coding is performed by the coder 11 (step 105) and the compressed video code is stored in the RAM 3 (step 106).

Next, a check is performed to determine whether the processed frequency component is the final frequency component or not (step 107). If not, the process returns to the step 100, and otherwise, (i.e. the processed frequency component is the final frequency component) the frequency component to be processed is modified (step 108). Then, a judgement is made to determine whether the current block is the final block or not (step 109). If not, process is returned to the step 100, and otherwise, (i.e. when the block is the final block) the, video compression is terminated.

Figure 12:
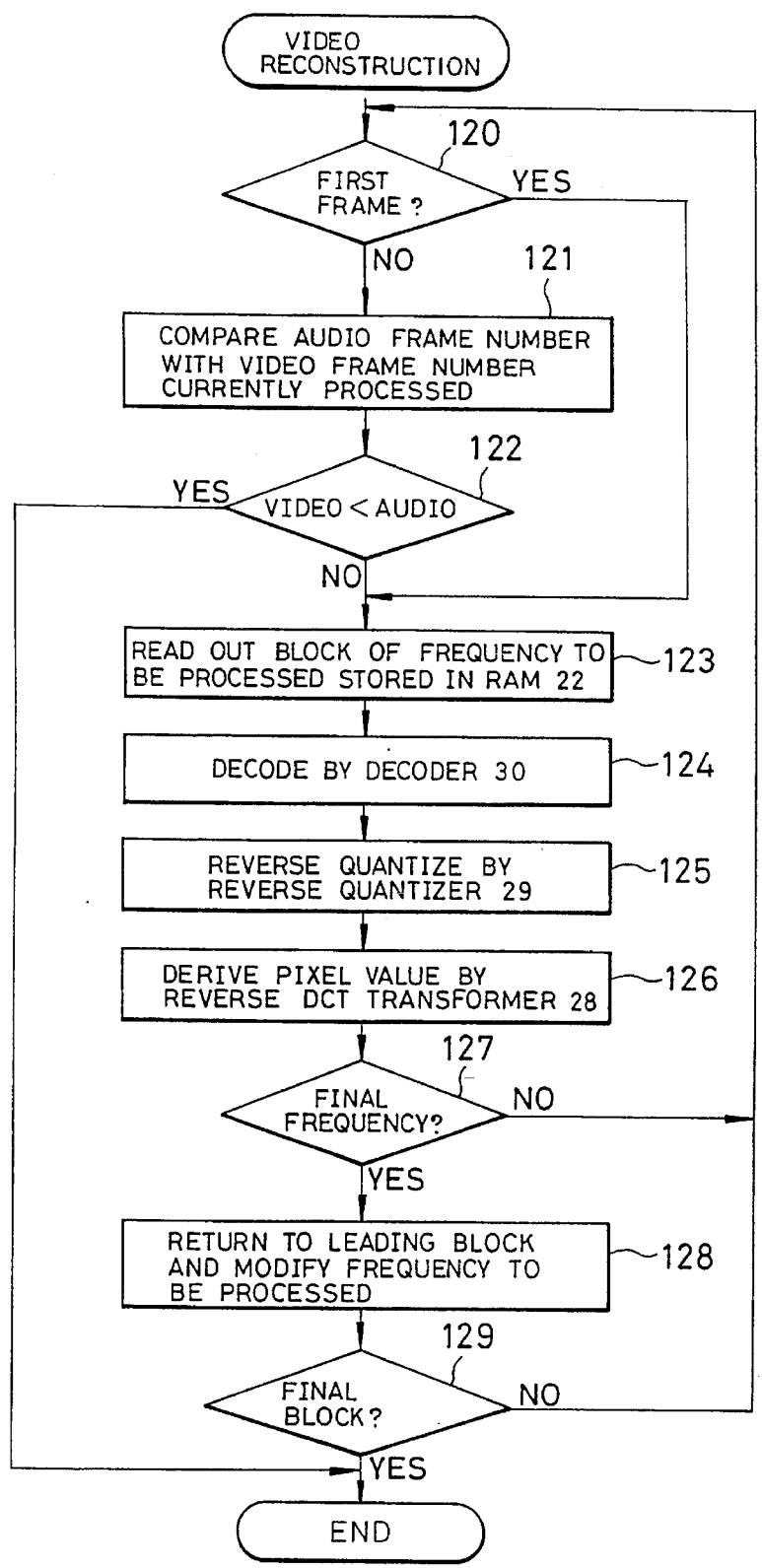
FIG. 12 is a flowchart showing the reconstruction process of FIG. 10.

FIG. 12 is a flowchart for the video reconstruction process. Upon reconstruction, as shown in FIG. 12, once video reconstruction is initiated, a check is initially performed to determine whether the current frame is the first frame (step 120). If so, the process is advanced to a step 123. Otherwise, a comparison is made between the audio frame number and the video frame number currently being processed (step 121) to determine whether the video processing is delayed from the audio processing or not (step 122). If delayed, after completion of compression for the currently processed block, the video signal processing for the current frame is terminated. Otherwise the compressed video code stored in the RAM 22 is read out (step 123) and decoded by the decoder 30 (step 124). Then reverse quantization is performed by the reverse quantizer 10 (step 125), and the value of the image is derived by the reverse DCT transformer 28 (step 126).

Next, the check is performed to determine whether the processed frequency component is the final frequency component or not (step 127). If not, the process returns to the step 120, and otherwise (i.e. the processed frequency component is the final frequency component) the frequency component to be processed is modified (step 128). Then, judgement is made whether the current block is the final block or not (step 129). If not, process is returned to the step 120, and otherwise (i.e. when the current block is the final block) the video reconstruction is terminated.

Figure 13:
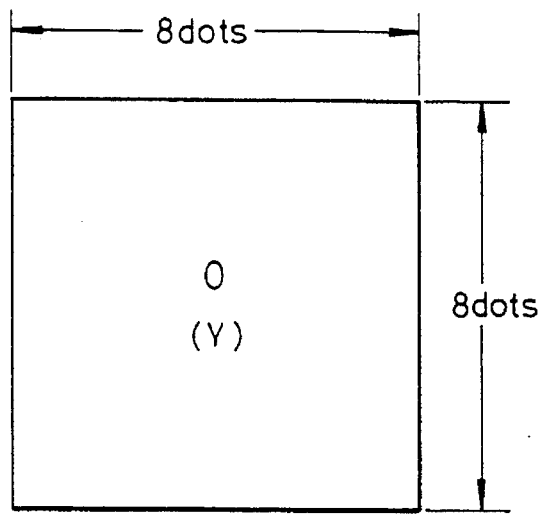
FIG. 13 is an illustration showing an example, in which the one block of image is further divided into a plurality of chrominance components.
Figure 13:
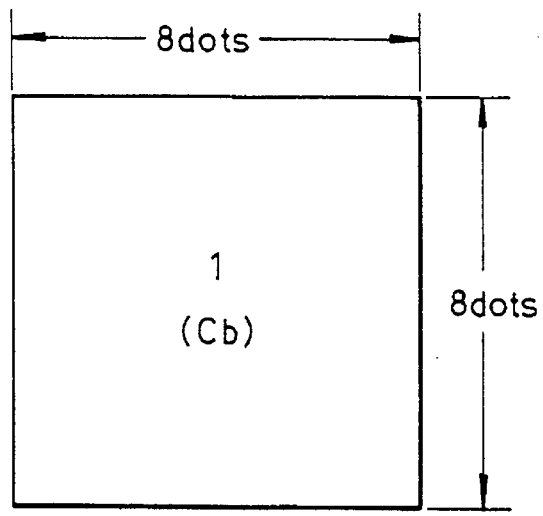
Figure 13:
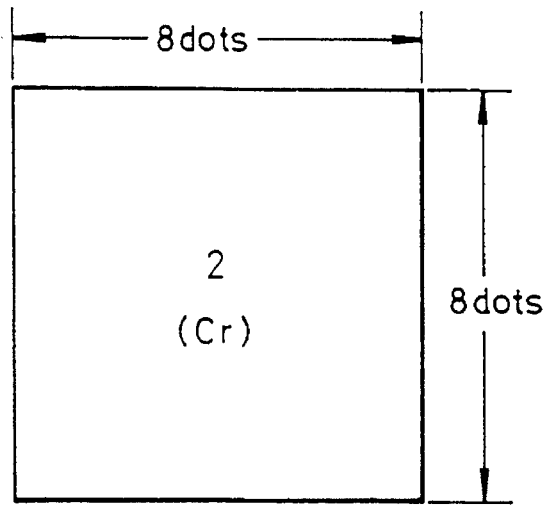

(3) Interruption Operation per Chrominance Component of Video Compression and Reconstruction Process FIGS. 13–15 is an illustration showing an example of process for establishing synchronization between the audio and video data by interrupting the video compression and reconstruction process based on chrominance components in the block unit when the video compression and reconstruction process is delayed to from the audio compression and reconstruction process. FIG. 13 shows an example that with respect to each block (one block of in FIG. 5.) is further divided into three components: a Y component, Cb component and Cr component. Then, the process is performed in the following order. First the 0th–35 blocks of 0th chrominance component are processe, then the 0th–35th blocks of the 1st chrominance component are processed, and then and 0th to 35th blocks of the 2nd chrominance component are processed.

As shown in FIG. 14(A), the audio data and video data in the same frame are processed in parallel. Here, assuming that while the 30th block of the 2nd chrominance component of the 2nd frame is being processed and the audio compression process is initiated for the 3rd frame, the 31st block of the 2nd chrominance component of the 2nd frame is not processed so that the process from the 0th block in the 0th chrominance component of the 3rd frame can be stated.

The audio and video codes thus generated are stored. As shown in FIG. 14(B), the codes (C000–C035) of the 0th–35th blocks of the 0th chrominance component, the codes (C100–C135) of the 0th–35th blocks of the 1st chrominance component, the codes C200–C235) of the 0th–35th blocks of the 2nd chrominance component of the 1st frame are stored. For the 2nd frame, in which the interruption is caused, the codes (C000–C135) of the 0th–35th blocks of the 0th–1st frequency components, and the codes (H200–H230) of the 0th–30th blocks of the 2nd chrominance component are only stored.

FIG. 15 shows a flowchart for interrupting the process for the video compression per a unit of the chrominance component. As shown in the flowchart of FIG. 15, once video compression is initiated, a judgement is made to determine whether the current frame is the first frame (step 140). If so, the process is jumped to a step 143, and otherwise, the audio frame number and the video frame number currently processed are compared with each other (step 141) to determine whether the video processing is delayed with respect to the audio recording (step 142). If delayed, after completion of compression for the currently processed block of the chrominance component, the video signal processing for the current frame is terminated. Otherwise the chrominance component is derived from the block by the DCT transformer (step 143). Then quantization is performed by the quantizer 10 (step 144), high efficiency compressive coding is performed by the coder 11 (step 145) and the compressed video code is stored in the RAM 3 (step 146) Next, a check is performed to determine whether the current block is the final block or not (step 147). If not, the process returns to the step 140, and otherwise (i.e. the current block is the final block) the block is returned to the leading block and the chrominance component to be processed is modified (step 148). Then, a judgement is made to determine whether the processed chrominance component is the final chrominance component or not (step 149). If not, process is returned to the step 140, and otherwise (i.e. when the processed chrominance component is the final chrominance component), the then video compression is terminated.

Figure 16:
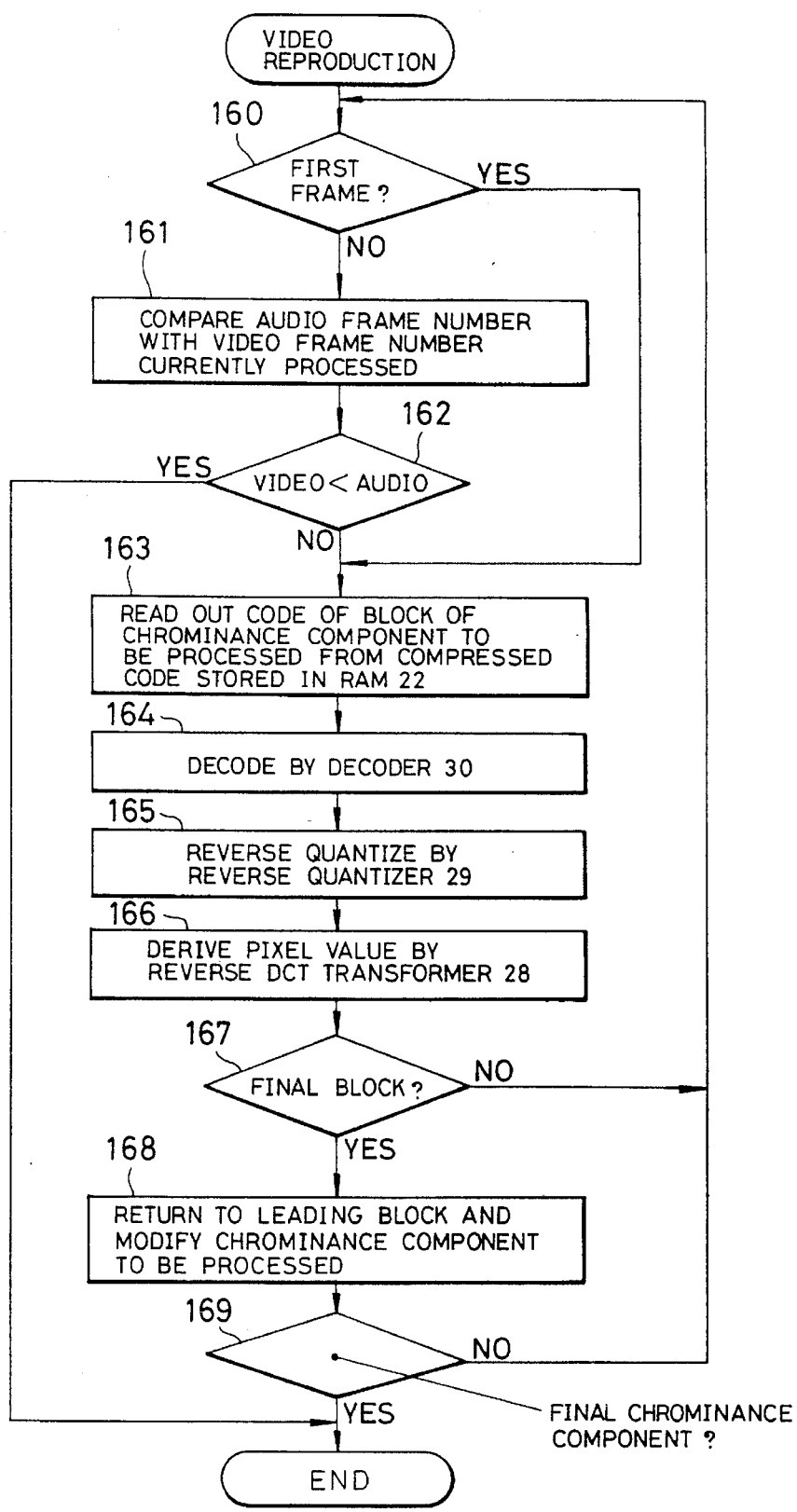
FIG. 16 is a flowchart showing reconstruction process of FIG. 14.

FIG. 16 is a flowchart for the video reconstruction process. Upon reconstruction, as shown in FIG. 16, once video reconstruction is initiated, a check is initially performed to determine whether the current frame is the first frame (step 160). If so, the process is advanced to a step 163. Otherwise, a comparison is made between the audio frame number and the video frame number currently being processed (step 161) to determine whether the video processing is delayed from the audio processing or not (step 162). If delayed, after completion of compression for the currently processed block, the video signal processing for the current frame is terminated. Otherwise the compressed video code stored in the RAM 22 is read out (step 163) and decoded by the decoder 30 (step 164). Then, reverse quantization is performed by the reverse quantizer 10 (step 165), and the value of the image is derived by the reverse DCT transformer 28 (step 166).

Next, the check is performed to determine whether the current block is the final block or not (step 167). If not, the process returns to the step 160, and otherwise (i.e. the current block is the final block) the block is returned to the leading block and the chrominance component to be processed is modified (step 168). Then, a judgement is made to determine whether the processed chrominance component is the final chrominance component or not (step 169). If not, the process is returned to the step 160, and otherwise (i.e. when the processed chrominance component is the final chrominance component) the video compression is terminated.

It should be noted that the input video data and the input audio data (data read out from the recording medium or data received through the telecommunication circuit) in the shown embodiment of the video and audio reconstruction process are employed as data which are not effected by the synchronization process upon the video and audio compression process, and the synchronization process is performed upon reconstruction therefor.

Next, another embodiment of a synchronous reconstruction system according to the present invention will be discussed. In this embodiment, a reconstruction time axis for the audio data is assumed as conceptual operation time of the overall system. Then, a deviation of displaying timings of an actual video frame displayed at the audio reconstruction processing period for a unit data amount and an ideal frame estimated to be displayed at the same timing determined by calculation are measured to establish synchronization of the sequential image and voice data by modifying the display timing of the actual frame.

It should be appreciated that the video frame represents one still image of the dynamic image. Assuming that the video data is converted into numerical data through coding process, it will be referred to a coded image frame. Also, this unit is simply referred to as frame. The actual frame means an actually displayed frame at an arbitrary designated timing of the dynamic image which is reproduced depending upon the operation speed of the video decoding reconstruction apparatus and nature of the image. Ideal frame means the video frame to be displayed at arbitrary designated timing when the reconstruction processing speed of the audio data is constant and does not vary within the unit period and the period required for composite reconstruction of the image is sufficiently short.

Figure 17:
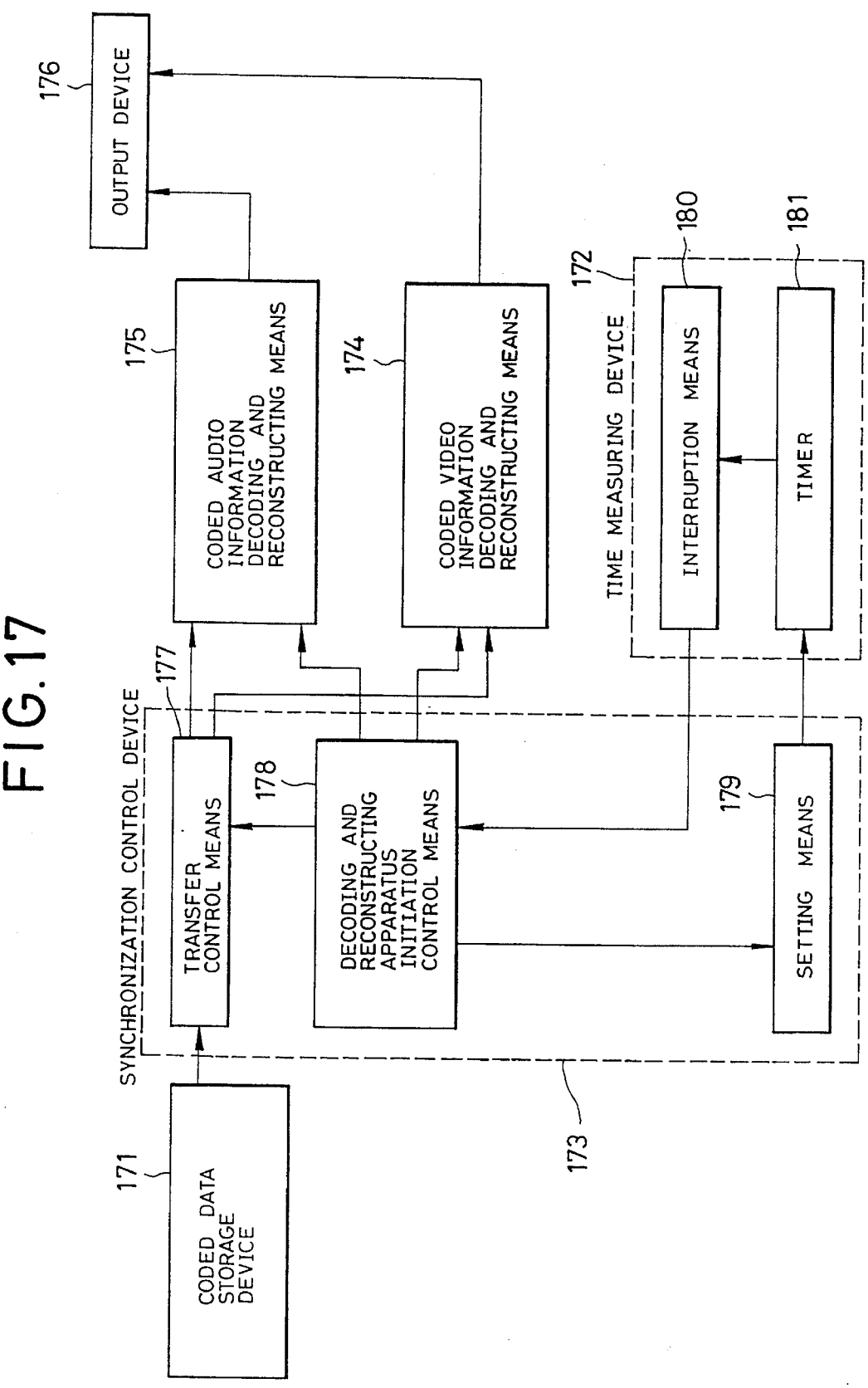
FIG. 17 is a block diagram of another embodiment of the present invention.

The construction of the embodiment is illustrated in FIG. 17. The embodiment of the synchronous reconstruction system includes a coded data storage device 171 for storing preliminarily coded video and audio data, a synchronization control device 173 receiving the video and audio data from the storage device 171, controlling the mutual output timing of the image and voice with reference to a time measuring device 172, and outputting the video data in a data amount of one frame and the audio data in a data amount corresponding to the one frame of coded video data. The system further includes a coded video data decoding and reconstructing apparatus 174 for decoding and reconstructing every frame of video data output from the synchronization control device 173, a coded audio data decoding and reconstructing apparatus 175 for decoding and reconstructing the audio data of a data amount arbitrarily given by the synchronization control device 173, and an output device 176 for receiving the reconstruction outputs of the coded video data decoding and reconstructing apparatus 174 and the coded audio data decoding and reconstructing apparatus 175 to convert then into visible and audible data.

Furthermore, the synchronization control device 173 can be implemented by software and may include a transfer control means 177 for reading out video and audio data from the storage device 171 and transferring them to the coded video data decoding and reconstructing apparatus 174 and the coded audio data decoding and reconstructing apparatus 175, and may also include a decoding and reconstruction apparatus initiation control means 178 for controlling the coded video data decoding and reconstructing apparatus 174, the coded audio data decoding and reconstructing apparatus 175 and the transfer control means 177 with reference to the time measuring device 172, and a setting means for setting an interruption time interval I of the time measuring device 172. Similarly, the time measuring device 172 may be implemented software including an interruption means 180 for effecting interruption and a timer 181 for measuring an arbitrary period.

Here, the present invention performs decoding and reconstruction of data in response to an operation initiation command provided when the coded data to be decoded and reproduced is stored in the buffer memory, without constraining the digital coding method of the video and audio signals handled by the coded video data decoding and reconstructing apparatus 174 and the coded audio data decoding and reconstructing apparatus 175. Also, a buffer memory having a sufficient capacity for desired functions is provided. This process is adapted to perform reconstruction for one frame of the video data and arbitrary determined data amount of the audio data at one time.

In the coded data storage device 171, the recording format of the video and audio data and the coupling method therefor are not specified to enable reading out of data at sufficiently high speed. For instance, time code and format, in which the audio data are arranged at upstream and downstream of the video data may be employed as long as consistency can be judged.

Figure 18:
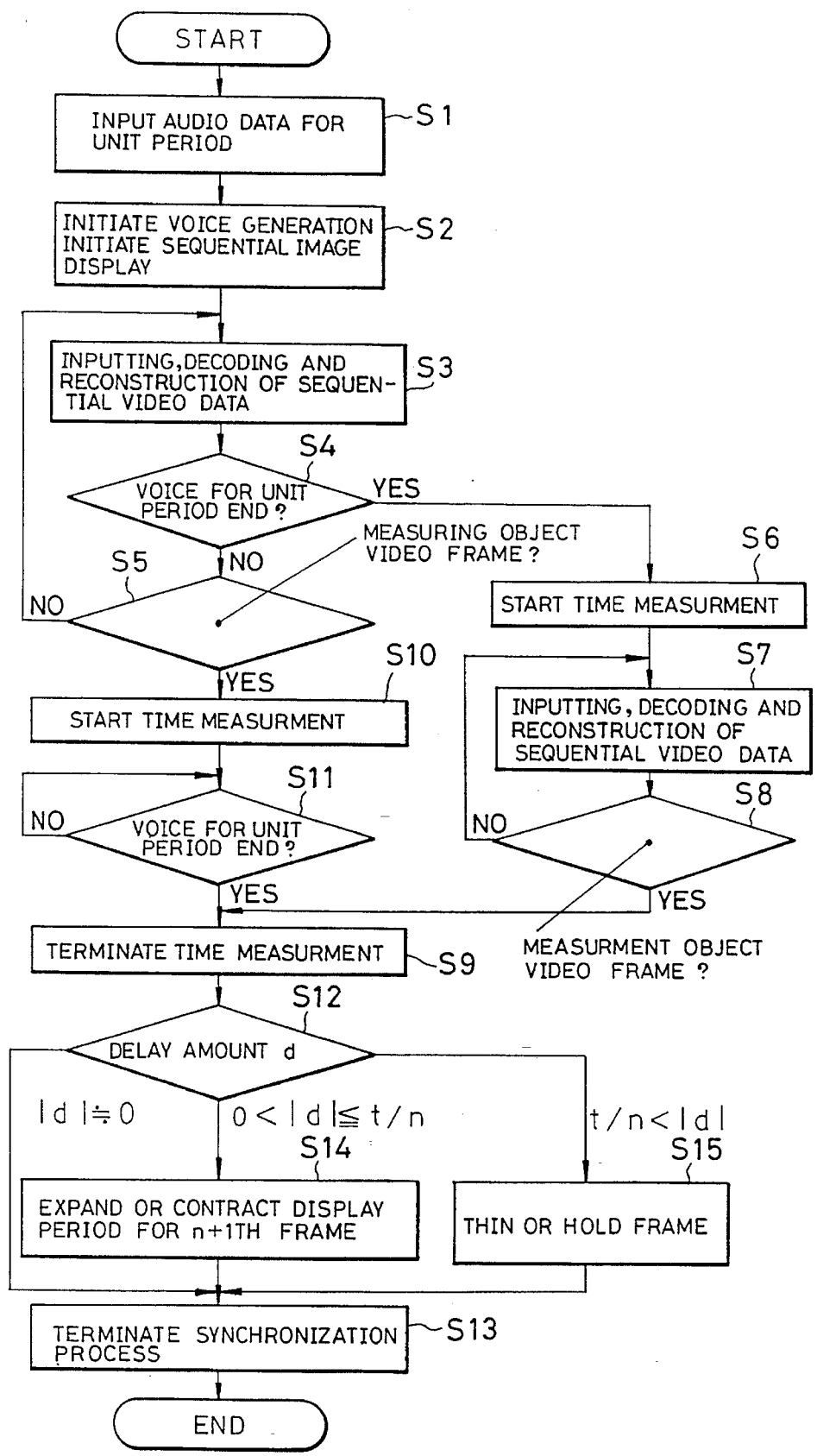
FIG. 18 is a flowchart showing an operation of the blocks of FIG. 17.

Next, the operation of this embodiment will be discussed. FIG. 18 is a flowchart showing the operation of the embodiment.

Once operation is initiated, the decoding and reconstructing apparatus initiation control means 178 in the synchronization control device 173 inputs coded audio data read out from the coded data storage device 171 to the data buffer in the coded audio data decoding and reconstructing apparatus 175 for a arbitrary determined unit period t, at a step S1. At this time, reconstruction of the video data is preliminarily corresponded so that n frames can be reproduced within the unit period t. Next, at a step S2, the decoding and reconstructing apparatus initiation control means 178 commands the start of generation of sound and the start of displaying of a sequential image for t seconds as the unit period. At a step S3, one frame of coded video data is input to the coded video data reconstructing apparatus 174 via the transfer control means 177 to initiate the decoding and reconstructing function. The input coded data is decoded by internal control of each decoding and reconstructing apparatus and becomes visible and audible when provided to the output device 176 as converted analog voice and audio signals. At this point, displaying of the image and generation of sound for the first frame is initiated.

Next, the decoding and reconstructing apparatus initiation control means 178 inputs the second frame of coded video data to the coded video data decoding and reconstructing apparatus 174 to trigger the decoding and reconstructing function. The coded video data decoding and reconstructing apparatus 174 instantly initiates the reconstructing operation and the output device 176 displays the second frame in synchronism with its own operational clock. By repeating this operation for n times, n frames of a dynamic image can be reproduced for display. Also, by repeating the process n+1 times, the dynamic image of over n frames can be reproduced.

Figure 19:
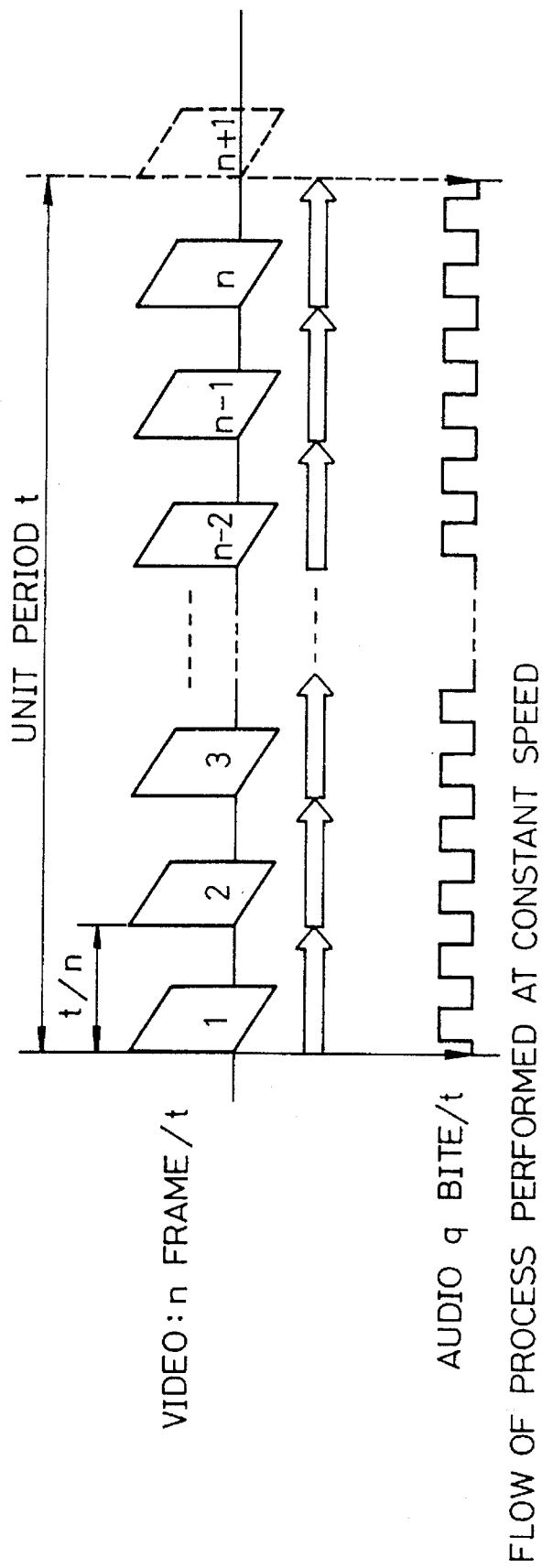

Here, the video data to be used for reconstruction is for n frames. Assuming that there is not fluctuation in the reconstructing function of the video and audio data and reconstruction is performed regularly, reconstruction of nth frame of the video data should be accurately completed after exactly t seconds. Then, that timing (i.e. t sounds) is the initiation timing of reconstruction of the n+1 frame, as shown in FIG. 19. Here, the n+1 frame of the video data will be referred to as "measurement object video frame".

However, it is unlikely to simultaneously complete reconstruction of the video data and the audio data without causing any error. Normally, either of the video and audio data reconstruction is completed at earlier timing than the other. Therefore, there is a certain magnitude of difference between the termination timing of reconstruction of the video data and the audio data. In order to measure a timing difference between the audio reconstruction completion timing and the display timing of the video data of the n+1 frame, a check is performed to determine whether the period t has expired and the reconstruction of the audio data is completed or not. If not completed, at every time of the decoding and reconstructing operation of each frame, is performed for a check is performed to determine whether the image is the measurement object video frame at a step S5. If not, the process returns to the step S3.

When judgement is made that the unit period t is has elapsed and reconstruction of the audio data is completed at the step S4, the timer 181 is set by the setting means 179 to initiate time measurement, at a step S6. Subsequently, at a step S7, the coded video data is input to the coded video data decoding and reconstructing apparatus 174 to a decoding and reconstructing function. At a step S8, at every occurrence of the reconstruction of respective video frames, a check is performed to determine whether the image is the measurement object video frame or not. This is repeated until the measurement object video frame is detected. When the measurement object video frame is detected, the measurement of the time is terminated at a step S9.

On the other hand, if the reconstruction of the audio data at the step S4 is not yet completed and the judgement is made that the video frame is the measurement object video frame at the step S5, the timing is set by the setting means 179 at a step S10 to initiate measurement of the time. Subsequently, at a step S11, when judgement is made that the unit period t has elapsed and the reconstruction of the audio signal is completed, the measurement of the period is terminated similarly to the step S8.

It should be noted that the measurement of the elapsed time by the time measuring device 172 employs the interruption means 180 connected to the timer 181. At every time interval i, interruption for the synchronization control system 173 is effected. The synchronization control system 173 counts the number of occurrences of the interruption to measure the elapsed time. However, the method for measuring the period is not specified to the shown method. Once a measurement of the elapsed time is completed at the step S9, then the delay amount of the video and audio data is set with the elapsed time to perform the following process according to the magnitude of the delay d, at the step S12.

As set forth above, ideally, when the displayed frame after t seconds is the n+1th video frame or the delay magnitude d is within the period required for displaying (within a vertical fly-back period, i.e. d≈0, of the output device 176), the coincidence of video and audio data is considered established. Then, synchronization process is terminated at a step S13. At a step S14, the display period of the n+1th frame is expanded or shortened to effect synchronization correcting operation, then the synchronization process is terminated at the step S13.

In detail, when the audio data is delayed, the display timing of the n+2th frame is delayed to expand the display period of the n+1th frame to make the end coincident with the end of the audio reconstruction. On the other hand, when the video data is delayed, the display timing of the n+2th frame is advanced to shorten the display period of the n+1th frame to make the end coincident with the end of the audio reconstruction.

At a step S12, when the delay magnitude d is greater the display period of one frame (d>t/n seconds), correction of synchronization is performed by thinning one or more frames or repeating the display of the same frame at a step S15, and then synchronization process is terminated at the step S13. In detail, when the audio reconstruction is delayed, displaying of the n+2th frame is postponed to expand the display period of n+1th frame until the synchronization with the audio reconstruction can be established. On the other hand, when the video reconstruction is delayed, n+2th frame is completely prevented from being displayed to effect adjustment beyond the display period of one frame (t/n seconds). Namely, in this case, the order of display is [... n−1, n, n+1, n+3...]. If preventing the display of the n+2th frame is not sufficient for correction, n+3, 4, 5th frames may also not be displayed.

Next, further discussion will be given with concrete numerical values.

Here, in order to realize the video and audio synchronization system on a general purpose personal computer (hereafter referred to as PC), the coded video data decoding and reconstructing apparatus 174 and the coded audio data decoding and reconstructing apparatus 175 are realized on an extended board corresponding to the PC. Also, the output device 176 (one which requires approximately 33 msec. for displaying one frame of video data) is provided. On the other hand, in order to realize the coded data storage device 171 and the synchronization control device 173 with programs, RAM is provided. However, as set forth above, the buffer memories necessary for the decoding and reconstructing apparatus 174 and 175 are respectively included in the decoding and reconstructing apparatus 174 and 175. Also, the speed of data transfer is sufficiently high.

The system is made to reproduce a dynamic movie (image and voice) longer than or equal to two seconds. In addition, for convenience of the discussion, the coded audio data is assumed as [4 bit, stereo 8.27 Khz of ADPCM (adaptive differential type pulse code modulation system)], and one second (8270 bites) of the audio data is transmitted as one unit. On the other hand, when the reconstruction of one a second of audio data is completed, second unit of audio data is continuously transferred to continue reconstruction so that the voice will not be interrupted even in the reconstruction of the dynamic movie of longer than or equal to two seconds.

During operation, in conjunction with initiation of decoding and reconstruction of the audio data, the data transfer of the first frame of video data, and the decoding and reconstruction thereof is initiated. By repeating the decoding and reconstructing operation of the video data, decoded and reconstructed frames are counted. When the number of frame reaches the measurement object frames number (the case where the video reconstruction speed is high and audio reconstruction speed is low, will be referred to as pattern A), or audio reconstruction is completed (the case where the video reconstruction speed is low and audio reconstruction speed is high, will be referred to as pattern B), the timer 181 (since it is desirable to use a convenient value, such as 10 msec as interruption interval of the timer 181, 10 msec. is used in this example) starts operation.

The timer 181 is stopped when the one second audio reconstruction is completed in the pattern A, or the measurement object frame is reached in the pattern B. The number of timer interruptions is then calculated and delay magnitude is determined. Here, assuming that the predetermined number of the video frames to be displayed within one second is 15 (hereafter, since t/n≈0.66 msec., the following discussion will be given assuming 0.66 msec.), discussion will be given by classifying with the delay magnitude d.

Figure 20:
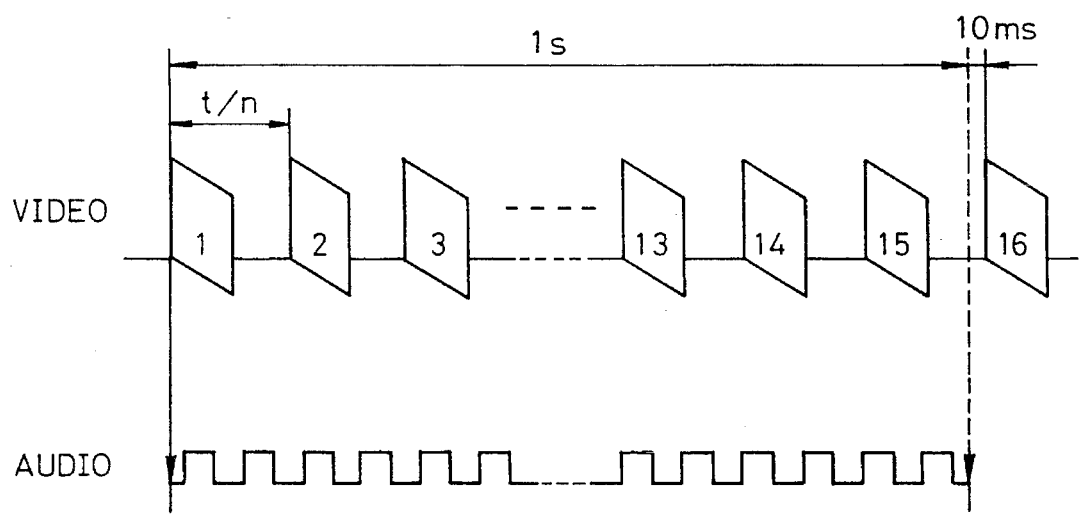

When the delay magnitude d is caused by:

(1) video reconstruction being later than audio reconstruction for 10 msec. (FIG. 20);

(2) video reconstruction being later than audio reconstruction for 50 msec. (FIG. 21)

(3) video reconstruction being later than audio reconstruction for 70 msec. (FIG. 22)

Figure 23:
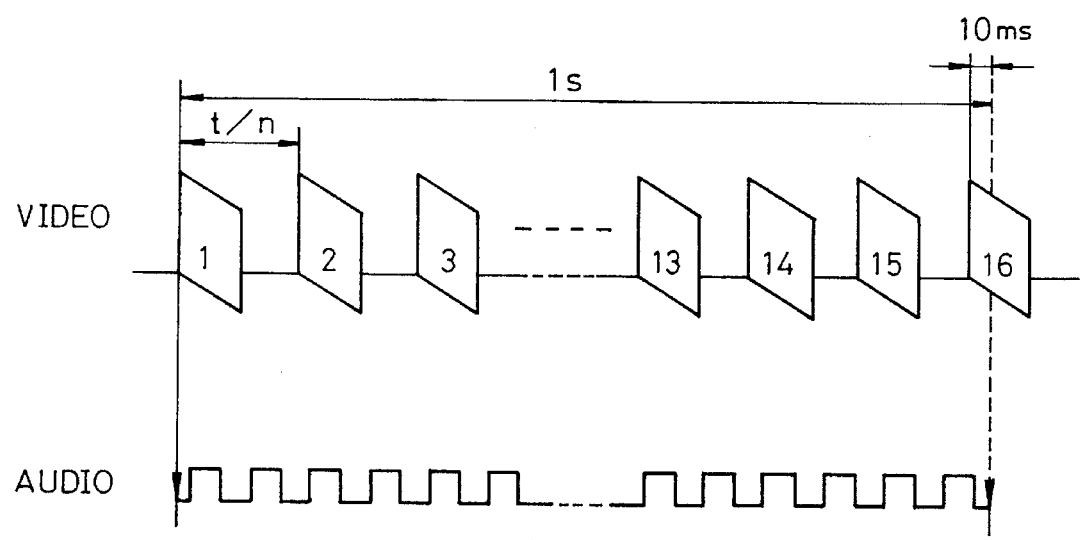

(4) audio reconstruction being later than video reconstruction for 10 msec. (FIG. 23)

(5) audio reconstruction being later than video reconstruction for 50 msec. (FIG. 24)

(6) audio reconstruction being later than video reconstruction for 70 msec. (FIG. 25)

For respective of the cases, the manner of correction of synchronization will be discussed hereinafter. It should be noted that FIGS. 21, 22, 24 and 25 are illustrated as separated drawings (A) and (B), in which (A) illustrates delay condition of the video and audio reconstruction, and (B) illustrates manner of correction of synchronization.

(1) When Video Reconstruction is later than Audio Reconstruction for 10 msec. (FIG. 20)

This is the condition where |d|≈0 is judged at the step S12 of FIG. 18. Therefore, correction of the synchronization is not performed.

(2) When Video Reconstruction is later than Audio Reconstruction for 50 msec. (FIG. 21)

This is the case where 0<|d|≦t/n is judged at the step S12 of FIG. 18, and thus the video reconstruction is delayed. In this case, the display period of 16th frame (n+1) is shortened. In the shown case, the delay magnitude d is greater than a shortened display period of 33 msec. for one frame of the output device and smaller than typical display period 66 msce of one frame. Therefore, the display period of the n+1th frame is shorted for 33 msec. Namely, correction of synchronization can be performed by advancing the display timing of the n+2th frame for 33 msec.

(3) When Video Reconstruction is later than Audio Reconstruction for 70 msec. (FIG. 22)

This is the condition where t/n <|d| is judged at the step S12 of FIG. 18 and the video reconstruction is delayed. In this case, the 17th frame (n+2) is displayed. In the shown case, the delay magnitude d is greater than typical display period of 66 msec. of one frame. Therefore, by skipping the 17th frame, the data of the 18th frame (n+3) is transferred to the video data decoding and reconstructing apparatus 174. By this operation, the frames actually reproduced are [1, . . . 15. 16, 18. . . ] for correction of synchronization.

(4) When Audio Reconstruction is later than Video Reconstruction for 10 msec. (FIG. 23)

This is the condition where |d|≈0 is judged at the step S12 of FIG. 18. Therefore, correction of the synchronization is not performed.

(5) When Audio Reconstruction is later than Video Reconstruction for 50 msec. (FIG. 24)

This is the condition where 0<|d|≦t/n is judged at the step S12 of FIG. 18 and the audio reconstruction is delayed. The display period of 66 msec. of the 16th frame is extended to delay the decoding and reconstructing timing of the 17th frame (n+2) to make a correction of synchronization. This process is differentiated from that of (2) in that, in the former case the video reconstruction is delayed relative to the audio reconstruction, but, in the case, the audio reconstruction is delayed with respective to the video reconstruction.

(6) When Audio Reconstruction is later than Video Reconstruction for 70 msec. (FIG. 25)

This is the case where t/n <|d| is judged at the step S12 of FIG. 18. Similar to (5), the display period of the 16th frame is, although the practical process is the same as (5), the display is maintained for a longer period. Here, since the display period for one frame is 66 msec., the correction for 70 msec. is a correction for approximately one frame.

As set forth above, depending upon the measured delay amount, the operation for correction of synchronization is performed with respect to each of the foregoing six cases. In the shown example, since reconstruction of the movie (image and voice) is for a period longer than or equal to 2 sec, the number of reproduced frames is subsequently counted to perform similar correction for synchronization and is performed at every arbitrary determined unit period t (1 second in the shown case).

Figure 26:
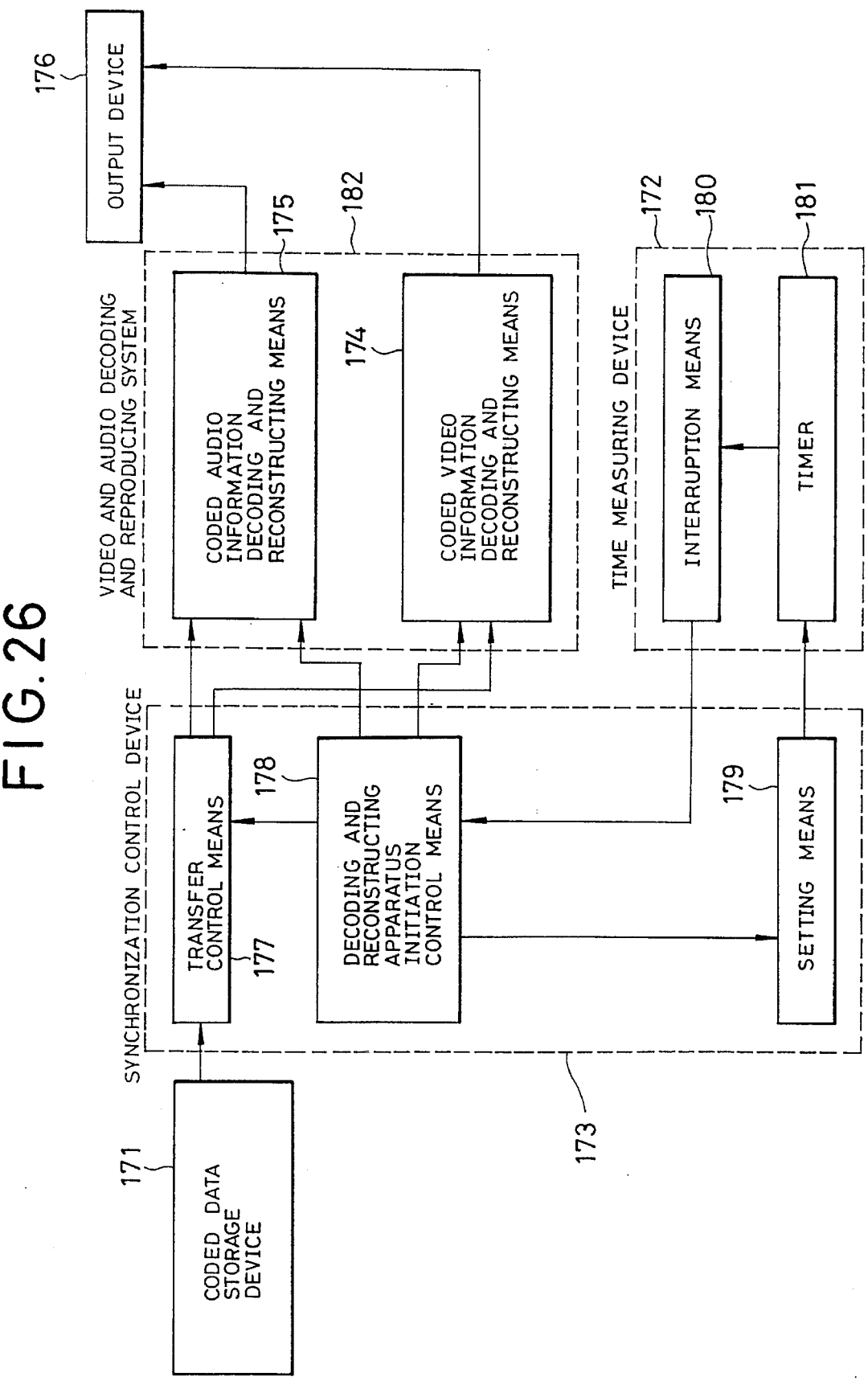
FIG. 26 is a block diagram of a further embodiment of the present invention.

FIG. 26 is a block diagram of a further embodiment of the synchronous reconstruction system according to the present invention. Like reference numerals represent like elements to those in FIG. 17. In this embodiment, a video and audio decoding and reconstructing system 182 including the coded video data decoding and reconstructing means 174 and the coded audio data decoding and reconstructing means 175 is implemented realized by software. Other portions are the same as those in FIG. 17. Therefore, further discussion is neglected for simplification of the disclosure.

Here, the method and system for coding the video signal and the audio signal to be handled by the coded video data decoding and reconstructing means 174 and the coded audio data decoding and reconstructing means 175 may be any method or system which can be processed by the software. In order to satisfy such functions, the buffer memory should have sufficient storage capacity. For instance, when the coded data to be decoded and reproduced is stored in buffer memory realized by a hard disk, decoding and reconstructing operation is performed in response to operation initiation command. This process performs reconstruction for the one frame of video data and arbitrary determined data amount of audio data at one time.

On the other hand, concerning the video data and the audio data stored in the coded data storage device 171, the recording format of the video and audio data and the coupling method therefor are not specified to enable reading out of data at sufficiently high speed. For instance, time code format in which the audio data are arranged upstream and downstream from the video data may be employed as long as consistency can be judged.

As set forth above, according to the present invention, by interrupting the video data compression process by adapting to the speed of the audio data compression process during video and audio data compression, higher speed in video data compression process can be achieved by automatically establishing synchronization with the audio data compression process. Also in reconstruction, by interrupting video data reconstructing process by adapting to the reconstruction speed of the audio data, higher speed is achieved in the video data reconstruction process with the automatic synchronization with the audio data reconstruction.

As a result, since the recording and reconstruction of the video data is combined with the appropriately adapted audio data, the audio data will never been recorded or reproduced with a deviation to the corresponding video data. Therefore, preparation of a data file and cumbersome simulated reconstruction becomes unnecessary.

Furthermore, according to the present invention, by detecting the speed difference between the video decoding and reconstruction and the audio decoding and reconstruction, the video data decoding and reconstructing timing is controlled with reference to the operation speed of the audio decoding and reconstructing for correcting. As a result, real time synchronization of the video reconstruction and audio reconstruction can be achieved so that disturbance for the audio reconstruction, such as interruption of voice in sequential reconstruction of the voice or tone variation, can be successfully avoided.

Although the invention has been illustrated and described with respect to exemplary embodiments, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A synchronous reconstruction system for synchronously decoding and reconstructing digitally coded video data and audio data, comprising:

storage means for preliminarily storing the digitally coded video and audio data;

video data reconstructing means for decoding and reconstructing the digitally coded video data per a predetermined data amount;

audio data reconstructing means for decoding and reconstructing the audio data.;

transfer control means for reading out said digitally coded video data and audio data from said storage means and transferring the read out digitally coded video data and audio data to said video data reconstructing means and said audio data reconstructing means, respectively; and control means responsive to a completion of both of a video reconstruction process of said video data reconstructing means and an audio reconstruction process of said audio data reconstructing means for controlling a modification of an initiation timing of said video data reconstructing means and an image display period after said video reconstruction process, wherein said control means comprises:

time measuring means in response to completion of one of said video reconstruction process and said audio reconstruction process for initiating measurement of an elapsed time and terminating said measurement of said elapsed time in response to said completion of both of said video reconstruction process and said audio reconstruction process;

means, responsive to termination of said measurement of the elapsed time by said time measuring means, for deriving a process speed difference between said video reconstruction process and said audio reconstruction process with reference to the elapsed time; and means for controlling said modification of said initiation timing of said video data reconstructing means or said image display period of video data after said video reconstruction process depending upon the processing speed difference.

2. A synchronous reconstruction system as set forth in claim 1, wherein said control means detects a completion of said audio reconstruction process for a given amount of audio data within a predetermined unit period of said audio data reconstructing means and detects a completion of said video reconstruction process for a given video data amount to be reproduced by said video data reconstructing means.

3. A synchronous reconstruction system as set forth in claim 2, wherein said control means controls to expand or shorten the image display period for the video data per data unit following the given video data amount to be reproduced within said unit period when the processing speed difference is smaller than or equal to a given value.

4. A synchronous reconstruction system as set forth in claim 3, wherein said control means controls thinning or holding of the video data per data unit following the given video data amount to be reproduced within said unit period when the processing speed difference is greater than a given value.

5. A synchronous reconstruction system as set forth in claim 2, wherein said control means controls thinning or holding of the video data per data unit following the given video data amount to be reproduced within said unit period when the processing speed difference is greater than a given value.

\* \* \* \* \*

UNITED STATES PATENT AND TRADEMARK OFFICE
CERTIFICATE OF CORRECTION

PATENT NO.    : 5,508,816
DATED         : April 16, 1996
INVENTOR(S)   : Hiroaki UEDA, et al.

It is certified that error(s) appears in the above-identified patent and that said Letters Patent is hereby corrected as shown below:

| | | |
|---|---|---|
| Column 1, | line 55, | after "reconstruction" insert --timing--. |
| Column 6, | line 62, | delete "5" and insert --65--. |
| Column 7, | line 60, | after "RAM" insert --3--. |
| Column 8, | line 19, | after "process" insert --after each--; |
| | line 24, | delete "frequency" and insert --frequencies--; before "vertical" insert --8--; |
| | line 28, | delete "follow" and insert --follows--. |
| Column 9, | line 61, | delete "processe" and insert --processed--. |
| Column 10, | line 5, | delete "stated" and insert --started--. |
| Column 12, | line 9, | after "implemented" insert --by--. |
| Column 13, | line 4, | delete "sounds" and insert --seconds--; |
| | line 20, | delete "of each frame"; after "for" insert --each frame--; |
| | line 24, | delete "is". |
| Column 14, | line 59, | delete "frame reaches the measurement object frames" and insert --frames reaches the measurement object frame--. |
| Column 15, | line 43, | delete "msce" and insert --msec--; |
| | line 51, | after "is" insert --no--. |

UNITED STATES PATENT AND TRADEMARK OFFICE
CERTIFICATE OF CORRECTION

PATENT : 5,508,816
DATED : April 16, 1996
INVENTOR(S) : Hiroaki UEDA, et al.

It is certified that error appears in the above-identified patent and that said Letters Patent is hereby corrected as shown below:

Column 16, line 12, after "is" insert --expanded--;
line 31, delete "realized".

Signed and Sealed this

First Day of October, 1996

Attest:

BRUCE LEHMAN

Attesting Officer

Commissioner of Patents and Trademarks